(12) United States Patent
Takesada et al.

(10) Patent No.: US 7,449,521 B2
(45) Date of Patent: Nov. 11, 2008

(54) ACRYLIC ELASTOMER COMPOSITION

(75) Inventors: Kentaro Takesada, Osaka (JP); Takao Manabe, Shiga (JP)

(73) Assignee: Kaneka Corporation, Osaka (JP)

( * ) Notice: Subject to any disclaimer, the term of this patent is extended or adjusted under 35 U.S.C. 154(b) by 216 days.

(21) Appl. No.: 10/549,708

(22) PCT Filed: Mar. 19, 2004

(86) PCT No.: PCT/JP2004/003806

§ 371 (c)(1),
(2), (4) Date: Sep. 16, 2005

(87) PCT Pub. No.: WO2004/087810

PCT Pub. Date: Oct. 14, 2004

(65) Prior Publication Data

US 2006/0183858 A1    Aug. 17, 2006

(30) Foreign Application Priority Data

Mar. 28, 2003 (JP) ............... 2003-091117
Mar. 28, 2003 (JP) ............... 2003-091118
Oct. 22, 2003 (JP) ............... 2003-361596

(51) Int. Cl.
*C08L 83/10* (2006.01)

(52) U.S. Cl. ............ 525/103; 525/100; 525/106; 525/222; 525/227; 524/268

(58) Field of Classification Search ............ None
See application file for complete search history.

(56) References Cited

U.S. PATENT DOCUMENTS

| | | | |
|---|---|---|---|
| 5,010,137 A | 4/1991 | Umeda et al. | |
| 5,166,244 A | 11/1992 | Fukushima et al. | |
| 5,272,205 A * | 12/1993 | Eichenauer et al. | 525/64 |
| 7,282,535 B2 * | 10/2007 | Kakeda et al. | 525/88 |
| 7,309,736 B2 * | 12/2007 | Taniguchi et al. | 525/88 |

FOREIGN PATENT DOCUMENTS

| | | | |
|---|---|---|---|
| JP | 55-7814 | * | 1/1980 |
| JP | 1-103636 A | | 4/1989 |
| JP | 3-172338 A | | 7/1991 |
| JP | 6-49313 A | | 2/1994 |
| JP | 6-67557 A | | 3/1994 |
| JP | 6-116498 A | | 4/1994 |
| JP | 6-157830 | * | 6/1994 |
| JP | 9-249784 A | | 9/1997 |
| JP | 2000-302941 A | | 10/2000 |
| JP | 3172338 B2 | | 3/2001 |
| JP | 2001-114808 A | | 4/2001 |
| WO | WO02/092696 | * | 11/2002 |
| WO | WO2004/013192 | * | 2/2004 |

OTHER PUBLICATIONS

International Preliminary Report on Patentability (Chapter I of the Patent Cooperation Treaty) from Corresponding International Application No. PCT/JP2004/003806, dated Mar. 2, 2006, 5 pages.
International Search Report from Corresponding International Application No. PCT/JP2004/003806, dated Jun. 22, 2004, 2 pages.

* cited by examiner

*Primary Examiner*—Marc S Zimmer
(74) *Attorney, Agent, or Firm*—Brinks Hofer Gilson & Lione

(57) ABSTRACT

The present invention provides an acrylic elastomer composition including an acrylic elastomer (A) and a polyorganosiloxane-containing graft polymer (B), and having excellent formability and mechanical physical properties, and both low-temperature characteristics and oil resistance. Acrylic rubber and an acrylic block copolymer can be used as the acrylic elastomer (A).

6 Claims, No Drawings

ACRYLIC ELASTOMER COMPOSITION

RELATED APPLICATIONS

This application is a nationalization of PCT application PCT/JP2004/003806 filed on Mar. 19, 2004, claiming priority to Japanese Application No. 2003-091117 filed on Mar. 28, 2003, Japanese Application No. 2003-091118 filed on Mar. 28, 2003, and Japanese Application No. 2003-361596 filed on Oct. 22, 2003.

1. Technical Field

The present invention relates to an acrylic elastomer composition having excellent formability and mechanical physical properties, and having both low-temperature characteristics and oil resistance, and comprising an acrylic elastomer and a polyorganosiloxane-containing graft polymer.

2. Background Art

Acrylic elastomers such as acrylic rubber and an acrylic block copolymer are polymers each comprising an acrylic ester as a main component, and are generally known as elastomer materials having excellent heat resistance and oil resistance and are used as materials for forming seals such as an oil seal, an O-ring, a packing, and the like. However, such acrylic elastomers generally have the problem of embrittlement at low temperature, and thus improvements in low-temperature characteristics are desired (Development of Automobile Polymer Material, CMC Publishing Co., Ltd., 1989, p. 219).

On the other hand, an acrylic elastomer containing an acrylic ester as a monomer component, which has a low glass transition temperature, has been developed for improving the low-temperature characteristics. However, the effect of deteriorating physical properties such as oil resistance and mechanical strength cannot be neglected, and further improvement is desired (Development of Automobile Polymer Material, CMC Publishing Co., Ltd., 1989, p. 219).

Furthermore, oil resistance and low-temperature characteristics are contrary to each other (International Publication No. 02/068482 Pamphlet), and the development of an elastomer material having both oil resistance and low-temperature characteristics has been desired.

DISCLOSURE OF INVENTION

An object of the present invention is to develop a composition having excellent formability and mechanical physical properties, and both low-temperature characteristics and oil resistance, the composition comprising an acrylic elastomer and a polyorganosiloxane-containing graft polymer.

As a result of intensive research for resolving the above-described problem, the inventors found that an acrylic elastomer composition comprising an acrylic elastomer (A) and a polyorganosiloxane-containing graft polymer (B) has both low-temperature characteristics and oil resistance, excellent formability such as a mold release property, and excellent mechanical physical properties, leading to the achievement of the present invention.

Namely, the present invention relates to an acrylic elastomer composition comprising an acrylic elastomer (A) and a polyorganosiloxane-containing graft polymer (B).

The acrylic elastomer composition of the present invention preferably comprises 50 to 98 percent by weight of the acrylic elastomer (A) and 50 to 2 percent by weight of the polyorganosiloxane-containing graft polymer (B).

The acrylic elastomer composition of the present invention preferably comprises acrylic rubber as the acrylic elastomer (A).

The acrylic elastomer composition of the present invention preferably comprises the acrylic rubber containing 0.01 to 20 percent by weight of a crosslinkable monomer unit on the basis of the entirety of the acrylic rubber.

The acrylic elastomer composition of the present invention preferably comprises the acrylic rubber, the polyorganosiloxane-containing graft polymer (B), and 0.005 to 10 parts by weight of a crosslinking agent on the basis of a total of 100 parts by weight of the acrylic rubber and the polyorganosiloxane-containing graft polymer.

The acrylic elastomer composition of the present invention preferably comprises, as the acrylic elastomer (A), an acrylic block copolymer comprising:
  (a) an acrylic polymer block; and
  (b) a methacrylic polymer block.

The acrylic elastomer composition of the present invention preferably comprises the acrylic block copolymer containing a unit (c1) having an acid anhydride group and/or a unit (c2) having a carboxyl group represented by formula (1).

Formula (1):

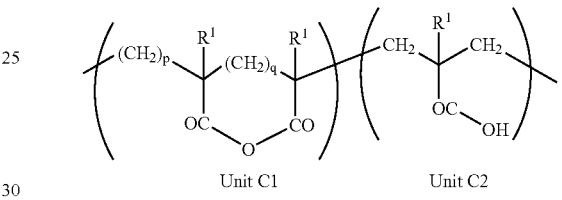

Unit C1    Unit C2

(wherein $R^1$ each represent a hydrogen atom or a methyl group and may be the same or different, p is an integer of 0 or 1, and q is an integer of 0 to 3).

The acrylic elastomer composition of the present invention preferably comprises the acrylic block copolymer containing 0.1 to 50 percent by weight of a unit (C2) having a carboxyl group on the basis of the entirety of the acrylic block copolymer.

The acrylic elastomer composition of the present invention preferably comprises the acrylic block copolymer containing 40 to 90 percent by weight of the acrylic polymer block (a) and 60 to 10 percent by weight of the methacrylic polymer block (b).

The acrylic elastomer composition of the present invention preferably comprises the acrylic polymer block (a) containing 50 to 100 percent by weight of a unit containing at least one monomer selected from the group consisting of n-butyl acrylate, ethyl acrylate, and 2-methoxyethyl acrylate, and 0 to 50 percent by weight of a unit containing another acrylate and/or another vinyl monomer copolymerizable therewith.

The acrylic elastomer composition of the present invention preferably comprises the acrylic polymer block (a) containing 5 percent by weight to 90 percent by weight of 2-methoxyethyl acrylate, 5 percent by weight to 90 percent by weight of n-butyl acrylate, and 5 percent by weight to 90 percent by weight of ethyl acrylate on the basis of the entirety of the acrylic polymer block.

The acrylic elastomer composition of the present invention preferably comprises the acrylic block copolymer produced by atom transfer radical polymerization.

The acrylic elastomer composition of the present invention preferably comprises the polyorganosiloxane-containing graft polymer (B) containing 5 to 40 percent by weight of a graft component and 95 to 60 percent by weight of polyorganosiloxane.

The acrylic elastomer composition of the present invention preferably comprises the polyorganosiloxane-containing graft polymer (B) comprising the graft component containing 5 to 99.5 percent by weight of an alkyl methacrylate and 95 to 0.5 percent by weight of an alkyl acrylate on the basis of the entirety of the graft component.

The acrylic elastomer composition of the present invention preferably comprises the polyorganosiloxane-containing graft polymer (B) comprising the graft component containing 0.5 to 50 percent by weight of n-butyl methacrylate as an essential alkyl methacrylate component on the basis of the entirety of the graft component.

The acrylic elastomer composition of the present invention preferably comprises the polyorganosiloxane-containing graft polymer (B) comprising the graft component containing 0.5 to 10 percent by weight of methacrylic acid or acrylic acid on the basis of the entirety of the graft component.

The acrylic elastomer composition of the present invention preferably comprises the acrylic elastomer (A) comprising a mixture of acrylic block copolymers including an acrylic block copolymer (E-1) which has an acrylic polymer block (a1) and a methacrylic polymer block (b), and an acrylic block copolymer (E-2) which has an acrylic polymer block (a2) different from the acrylic polymer block (a1) and the methacrylic polymer block (b), wherein the acrylic block copolymer (E-1) has a low-temperature brittle temperature at least 5° C. higher than that of the acrylic block copolymer (E-2).

The acrylic elastomer composition of the present invention preferably comprises 0.1 to 10 parts by weight of a lubricant, 0.1 to 100 parts by weight of an inorganic filler, and 0.1 to 100 parts by weight of a thermoplastic resin on the basis of 100 parts by weight of the acrylic elastomer (A).

The present invention also relates to a molded product comprising an acrylic elastomer composition.

The present invention further relates to automobile, electric and electronic parts each comprising a molded product of an acrylic elastomer composition.

The composition of the present invention comprising the acrylic elastomer and the polyorganosiloxane-containing graft polymer is excellent in oil resistance, low-temperature characteristics and mechanical properties, and the composition can thus be preferably used for moldings for automobile or electric products.

BEST MODE FOR CARRYING OUT THE INVENTION

Compositions of the present invention will be described in detail below. An acrylic elastomer composition of the present invention comprises an acrylic elastomer (A) and a polyorganosiloxane-containing graft polymer (B).

<Acrylic Elastomer (A)>

(Acrylic Rubber)

In the present invention, acrylic rubber can be preferably used as the acrylic elastomer (A). The acrylic rubber has an acrylate monomer unit comprising at least one selected as a main component from the group consisting of alkyl acrylates each having an alkyl group with 1 to 4 carbon atoms, and alkoxyalkyl acrylates each having an alkoxyalkyl group with 2 to 8 carbon atoms, and the acrylic rubber is preferably compolymerized with a small amount of unsaturated monomer having a crosslinking group such as a hydroxyl group, an epoxy group, a carboxyl group, a reactive halogen group, an amido group or an unsaturated group, or the like.

The content of the acrylate monomer unit in the acrylic rubber is not particularly limited as long as the content is 50 percent by weight or more. For example, when the acrylic rubber contains a crosslinkable monomer unit as a unit other than the acrylate monomer unit, mechanical strength and compression set can be improved by combining the crosslinking agent described below. The content of the crosslinkable monomer unit is preferably 0.01 to 20 percent by weight, and more preferably 0.02 to 15 percent by weight, on the basis of the entirety of the acrylic rubber. With the crosslinkable monomer unit at a content of less than 0.01 percent by weight, physical properties after crosslinking are not sufficiently improved in some cases, while with the crosslinkable monomer unit at a content of over 20 percent by weight, the acrylic rubber becomes brittle due to an excessive increase in the crosslinking density, thereby deteriorating physical properties in some cases.

Examples of the acrylate monomer include acrylate monomers such as methyl acrylate, ethyl acrylate, propyl acrylate, butyl acrylate, hexyl acrylate, cyclohexyl acrylate, octyl acrylate, and the like; acrylate monomers each having an alkylalkoxy group, such as methoxymethyl acrylate, methoxyethyl acrylate, ethoxyethyl acrylate, butoxyethyl, and the like. However, the acrylate monomer is not limited to these examples.

Although a wide range of known crosslinking components can be used as the crosslinkable monomer, a monomer containing a crosslinking component and copolymerizable with the acrylate monomer, for example, a unit containing an active halogen, a unit having an unsaturated double bond, a unit having an epoxy group, or the like, can be used.

More specifically, examples of the unit having an active halogen include (1) 2-chloroethyl vinyl ether, 2-chloroethyl acrylate, vinylbenzyl chloride, (2) vinyl chloroacetate, allyl chloroacetate, (3) addition reaction products of monochloroacetic acid and glycidyl compounds such as glycidyl acrylate, glycidyl methacrylate, ally glycidyl ester, and the like, (4) crosslinking site halogen-containing monomers such as α- or β-halogenated aliphatic monocarboxylic alkenyl esters, (meth)acrylic acid haloalkyl esters, haloalkyl alkenyl esters, haloalkyl alkenyl ketones, haloacetoxyalkyl esters, haloacetyl-containing unsaturated compounds, and the like. Examples of the unit having an unsaturated double bond include conjugated diene monomers such as butadiene, isoprene, cyclopentadiene, and the like; unsaturated norbornene monomers such as ethylidene norbornene, vinylidene norbornene, and the like; alkyenyl (meth)acrylates such as 2-butenyl (meth)acrylate, 3-methyl-2-butenyl (meth)acrylate, 3-methyl-2-pentyl (meth)acrylate, 3-methyl-2-hexenyl (meth)acrylate, and the like. Examples of the unit having an epoxy group include allyl glycidyl ether, glycidyl methacrylate, glycidyl acrylate, and the like.

In the present invention, the acrylic rubber may further contain a unit monomer other than the above-described monomers, which is copolymerizable with the acrylate monomer, within a range causing substantially no inhibition of the effect of the present invention. Examples of such a monomer unit include vinyl monomers such as ethylene, propylene, acrylonitrile, vinyl acetate, styrene, α-methylstyrene, acrylamide, vinyl chloride, acrylic acid, acrylic esters, polyalkylene glycol acrylic esters, methyl methacrylate, ethyl methacrylate, methacrylonitrile, vinylidene chloride, and the like. The method for producing the acrylic rubber is not particularly limited, and the acrylic rubber may be produced by a known polymerization method.

(Acrylic Block Copolymer)

In the present invention, an acrylic block copolymer can be preferably used as the acrylic elastomer (A), and the acrylic block copolymer preferably comprises (a) an acrylic polymer block and (b) a methacrylic polymer block. The acrylic block copolymer may be a linear block copolymer, a branched (star-shaped) block copolymer, or a mixture of these copolymers. These structures of the acrylic block copolymers may be properly used depending upon the required physical properties of the acrylic block copolymer, and the required working characteristics and mechanical characteristics of the composition with the polyorganosiloxane-containing graft polymer (B) possibly used for significantly improving the low-temperature brittleness of the acrylic block copolymer. However, the acrylic block copolymer is preferably a linear acrylic block polymer from the viewpoint of cost, ease of polymerization.

The linear acrylic block copolymer may have any linear block structure. However, from the viewpoint of the physical properties of the block polymer or the physical properties of the composition, the acrylic block copolymer is preferably at least one selected from the group consisting of acrylic block copolymers represented by formula $(a\text{-}b)_n$, $b\text{-}(a\text{-}b)_n$, or $(a\text{-}b)_n\text{-}a$ (wherein n is an integer of 1 to 3) and comprising an acrylic polymer block (a) (referred to as a "polymer block (a)" or a "block (a)" hereafter), and a methacrylic polymer block (b) (referred to as a "polymer block (b)" or a "block (b)" hereinafter). Particularly, a (a-b) type di-block copolymer, a (b-a-b) type tri-block copolymer, or a mixture of these copolymers is preferred from the viewpoint of ease of work handling and the physical properties of the composition.

The acrylic block copolymer preferably contains a unit (c) represented by formula (1):

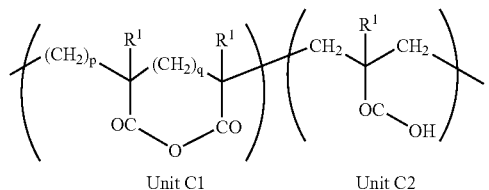

Unit C1    Unit C2

(wherein $R^1$ each represents a hydrogen atom or a methyl group and may be the same or different, p is an integer of 0 or 1, and q is an integer of 0 to 3). The unit (c) includes a unit (c1) containing an acid anhydride group and/or a unit (c2) containing a carboxyl group. At least one of the acrylic polymer block (a) and the methacrylic polymer block (b) may contain one or more units (c). When two or more units are contained, the monomer unit may be polymerized to a random copolymer or a block copolymer.

Types of a block copolymer containing the unit (c), for example, types of a b-a-b tri-block copolymer, include a (b/c)-a-b type, a (b/c)-a-(b/c) type, a c-b-a-b type, a c-b-a-b-c type, a b-(a/c)-b type, a b-a-c-b type, a b-c-a-b type, and the like. Any one of these types may be used. In these expressions, (a/c) represents that a block (a) contains unit (c), (b/c) represents that the block (b) contains the unit (c), and c-a- or a-c- represents that the unit (c) bonds to a terminal of the block (a). Any one of the expressions (a/c), (b/c), c-a-, and a-c- belongs to the block (a) or block (b).

The number-average molecular weight of the acrylic block copolymer measured by gel permeation chromatography is preferably 30,000 to 500,000, more preferably 40,000 to 400,000, and most preferably 50,000 to 300,000. With the molecular weight of less than 30,000, the sufficient mechanical properties of the elastomer cannot be exhibited in some cases, while with the molecular weight of over 500,000, working characteristics deteriorate in some cases.

The ratio (Mw/Mn) of the weight-average molecular weight (Mw) to the number-average molecular weight (Mn) of the acrylic block copolymer, which are measured by gel permeation chromatography, is preferably 1 to 2, and more preferably 1 to 1.8. With the ratio Mw/Mn of over 2, the uniformity of the acrylic block copolymer deteriorates in some cases. In the present invention, the number-average molecular weight and the weight-average molecular weight were determined in terms of polystyrene by gel permeation chromatography measurement using chloroform as a mobile phase.

The composition ratio of the acrylic polymer block (a) to the methacrylic polymer block (b) which constitute the acrylic block copolymer may be determined according to required physical properties, formability required for processing the composition, and the required molecular weight of each of the acrylic polymer block (a) and the methacrylic polymer block (b). A preferred range of composition ratios of the acrylic polymer block (a) to the methacrylic polymer block (b) is as follows. The ratio of the acrylic polymer block (a) is preferably 40 to 90 percent by weight, more preferably 45 to 80 percent by weight, and most preferably 50 to 70 percent by weight; and the ratio of the methacrylic polymer block (b) is preferably 60 to 10 percent by weight, more preferably 55 to 20 percent by weight, and most preferably 50 to 30 percent by weight. When the ratio of the acrylic polymer block (a) is less than 40 percent by weight, the mechanical properties, particularly, breaking elongation, and flexibility of the elastomer deteriorate in some cases, while when the ratio is over 90 percent by weight, mechanical strength deteriorates in some cases.

The glass transition temperatures of the acrylic polymer block (a) and the methacrylic polymer block (b) which constitute the acrylic block copolymer preferably satisfy the following relation:

$$Tg_a < Tg_b$$

wherein $Tg_a$ is the glass transition temperature of the acrylic polymer block (a) and $Tg_b$ is the glass transition temperatures of the methacrylic polymer block (b).

The glass transition temperature (Tg) of each of the polymer blocks (the acrylic polymer block (a) and the methacrylic polymer block (b)) can be determined by using the ratio by weight of each monomer of the polymer blocks according to the following Fox equation:

$$1/Tg = (W_1/Tg_1) + (W_2/Tg_2) + \ldots + (W_m/Tg_m) W_1 + W_2 + \ldots + W_m = 1$$

(wherein Tg represents the glass transition temperature of each polymer block, $Tg_1, Tg_2, \ldots, Tg_m$ each represent the glass transition temperatures of a polymerized monomer (homopolymer), and $W_1, W_2, \ldots, W_m$ each represent the ratio by weight of the polymerized monomer).

The glass transition temperature of each polymerized monomer is described in, for example, Polymer Handbook Third Edition, Wiley-Interscience, 1989, and it is used in the above-described Fox equation.

In the present invention, the acrylic elastomer (A) is preferably an acrylic block copolymer comprising a mixture of an acrylic block copolymer (E-1) comprising an acrylic polymer block (a1) and a methacrylic polymer block (b), and an acrylic block copolymer (E-2) comprising an acrylic polymer block (a2) different from the acrylic polymer block (a1) and the methacrylic polymer block (b). The low-temperature brittle temperature of the acrylic block copolymer (E-1) is preferably at least 5° C. higher than that of the acrylic block copolymer (E-2).

The acrylic block copolymer (E-1) and the acrylic block copolymer (E-2) which constitute the acrylic elastomer (A) have different low-temperature brittle temperatures which preferably have the relation $T_{A-1}-T_{A-2}>5(°\text{ C.})$ wherein the low-temperature brittle temperatures of the acrylic block copolymer (E-1) and the acrylic block copolymer (E-2) are $T_{A-1}$ (° C.) and $T_{A-2}$ (° C.), respectively. The composition ratio of the acrylic block copolymer (E-1) to the acrylic block copolymer (E-2) may be determined according to the required physical properties such as the low-temperature brittle temperatures, formability required for processing the composition, and the required molecular weights of the acrylic block copolymer (E-1) and the acrylic block copolymer (E-2).

The low-temperature brittle temperature of an acrylic block copolymer tends to depend upon the glass transition temperatures (Tg) of the acrylic polymer block (a) and the methacrylic polymer block (b), which constitute the acrylic block copolymer, and particularly the low-temperature brittle temperature greatly depends on Tg of the acrylic polymer block (a). The acrylic block copolymer (E-1) and the acrylic block copolymer (E-2) having difference low-temperature brittle temperatures can be formed by using acrylic polymer blocks (a) having different values of Tg, i.e., the acrylic polymer block (a1) and the acrylic polymer block (a2).

(Acrylic Polymer Block (a))

The acrylic polymer block (a) of the acrylic block copolymer has a glass transition temperature satisfying the relation $Tg_a<Tg_b$ to the glass transition temperature of the methacrylic polymer block (b). The acrylic polymer block (a) preferably contains 50 to 100 percent by weight, preferably 60 to 100 percent by weight, of a unit containing an acrylate, 0 to 50 percent by weight, preferably 0 to 40 percent by weight, of a unit having a functional group functioning as a precursor of the unit (c), and 0 to 50 percent by weight, preferably 0 to 25 percent by weight, of another vinyl monomer copolymerizable therewith on the basis of the entirety of the acrylic polymer block (a). With less than 50 percent by weight of the unit containing an acrylate, physical properties characteristic of the use of an acrylate, particularly tensile elongation, decrease in some cases.

The required molecular weight of the acrylic polymer block (a) may be determined according to the required elastic modulus and rubber elasticity of the acrylic polymer block (a), the time required for polymerization thereof, etc.

Assuming that the necessary number-average molecular weight of the acrylic polymer block (a) is $M_A$, a range of the necessary number-average molecular weight is preferably $M_A>3,000$, more preferably $M_A>5,000$, further preferably $M_A>10,000$, particularly preferably $M_A>20,000$, and most preferably $M_A>40,000$. However, since the polymerization time tends to increase as the number-average molecular weight increases, the number-average molecular weight may be determined according to required productivity, and is preferably 500,000 or less, and more preferably 300,000 or less.

Examples of the acrylate which constitutes the acrylic polymer block (a) include acrylic acid aliphatic hydrocarbon (for example, alkyl having 1 to 18 carbon atoms) esters such as methyl acrylate, ethyl acrylate, n-propyl acrylate, n-butyl acrylate, isobutyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, stearyl acrylate, and the like; acrylic acid alicyclic hydrocarbon esters such as cyclohexyl acrylate, isobornyl acrylate, and the like; acrylic acid aromatic hydrocarbon esters such as phenyl acrylate, tolyl acrylate, and the like; acrylic acid aralkyl esters such as benzyl acrylate, and the like; esters of acrylic acid with functional group-containing alcohols having ether oxygen, such as 2-methoxyethyl acrylate, 3-methoxybutyl acrylate, and the like; acrylic acid fluoroalkyl esters such as trifluoromethylmethyl acrylate, 2-trifluoromethylethyl acrylate, 2-perfluoroethylethyl acrylate, 2-perfluroethyl-2-perfluorobutylethyl acrylate, 2-perfluoroethyl acrylate, perfluoromethyl acrylate, diperfluoromethylmethyl acrylate, 2-perfluoromethyl-2-perluoroethylmethyl acrylate, 2-perflurohexylethyl acrylate, 2-perflurodecylethyl acrylate, 2-perfluorohexadecylethyl acrylate, and the like. These acrylates may be used singly or in a combination of at least two acrylates.

The acrylic polymer block (a) preferably comprises 50 to 100 percent by weight of a unit containing at least one monomer selected from the group consisting of n-butyl acrylate, ethyl acrylate, and 2-methocyethyl acrylate, and 0 to 50 percent by weight of a unit containing another acrylate and/or another vinyl monomer copolymerizable therewith.

Among these acrylates, n-butyl acrylate is preferred from the viewpoint of low-temperature characteristics, compression permanent set, cost and availability. When oil resistance and mechanical properties are required, ethyl acrylate is preferred. When low-temperature characteristics, mechanical properties and compression permanent set are required, 2-ethylhexyl acrylate is preferred. From the viewpoint of mechanical properties, oil resistance and low-temperature characteristics, a mixture containing 5 to 90 percent by weight of 2-methoxyethyl acrylate, 5 to 90 percent by weight of n-butyl acrylate, 5 to 90 percent by weight of ethyl acrylate on the basis of the entirety of the acrylic polymer block (a) is preferred, and a mixture containing 15 to 85 percent by weight of 2-methoxyethyl acrylate, 15 to 85 percent by weight of n-butyl acrylate, and 5 to 70 percent by weight of ethyl acrylate is more preferred.

Examples of a vinyl monomer copolymerizable with the acrylate which constitutes the acrylic polymer block (a) include methacrylates, aromatic alkenyl compounds, vinyl cyanide compounds, conjugated diene compounds, halogen-containing unsaturated compounds, unsaturated carboxylic acid compounds, vinyl ester compounds, maleimide compounds, and the like.

Examples of the methacrylates include methacrylic acid aliphatic hydrocarbon (for example, alkyl having 1 to 18 carbon atoms) esters such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, stearyl methacrylate, and the like; methacrylic acid alicyclic hydrocarbon esters such as cyclohexyl methacrylate, isobornyl methacrylate, and the like; methacrylic acid aralkyl esters such as benzyl methacrylate, and the like; methacrylic acid aromatic hydrocarbon esters such as phenyl methacrylate, tolyl methacrylate, and the like; esters of methacrylic acid and functional group-containing alcohols having ether oxygen, such as 2-methoxyethyl methacrylate, 3-methoxybutyl methacrylate, and the like; methacrylic acid fluoroalkyl esters such as trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate, 2-perfluorohexadecylethyl methacrylate, and the like.

Examples of the aromatic alkenyl compounds include styrene, α-methylstyrene, p-methylstyrene, p-methoxystyrene, and the like.

Examples of the vinyl cyanide compounds include acrylonitrile, methacrylonitrile, and the like.

Examples of the conjugated diene compounds include butadiene, isoprene, and the like.

Examples of the halogen-containing unsaturated compounds include vinyl chloride, vinylidene chloride, perfluoroethylene, perfluoropropylene, vinylidene fluoride, and the like.

Examples of the unsaturated dicarboxylic acid compounds include maleic anhydride, maleic acid, maleic acid monoalkyl and dialkyl esters, fumaric acid, fumaric acid monoalkyl and dialkyl esters, and the like.

Examples of the vinyl ester compounds include vinyl acetate, vinyl propionate, vinyl pivalate, vinyl benzoate, vinyl cinnamate, and the like Examples of the maleimide compounds include maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, and the like.

These copolymerizable monomers can be used singly or in a combination of at least two monomers. The vinyl monomer is preferably selected according to the required glass transition temperature, elastic modulus and polarity of the acrylic polymer block (a), and physical properties required for using the acrylic block copolymer as a composition, and compatibility with the polyorganosiloxane-containing graft polymer. For example, acrylonitrile may be copolymerized for improving oil resistance.

The glass transition temperature of the acrylic polymer block (a) is preferably 50° C. or less, and more preferably 0° C. or less. With a glass transition temperature of over 50° C., the rubber elasticity of the acrylic block copolymer decreases in some cases.

The glass transition temperature (Tg) of the acrylic polymer block (a) can be controlled by controlling the ratio by weight of each monomer constituting the polymer block according to the above-described Fox equation.

The glass transition temperature is determined according to the Fox equation using the polymerization ratio of each of the monomers, which constitute the polymer block, and a value described in "Polymer Handbook Third Edition" as the glass transition temperature of a homopolymer of each monomer.

(Methacrylic Polymer Block (b))

The methacrylic polymer block (b) of the acrylic block copolymer has a glass transition temperature satisfying the relation $Tg_a < Tg_b$ to the acrylic polymer block (a). From the viewpoint of ease of production of the acrylic block copolymer having desired physical properties, cost and availability, the methacrylic polymer block (b) preferably contains 0 to 100 percent by weight, preferably 0 to 85 percent by weight, of a unit containing a methacrylate, 0 to 100 percent by weight, preferably 15 to 100 percent by weight, of a unit having a functional group functioning as a precursor of the unit (c), and 0 to 50 percent by weight, preferably 0 to 25 percent by weight, of another vinyl monomer copolymerizable therewith on the basis of the entirety of the methacrylic polymer block (b).

The required molecular weight of the methacrylic polymer block (b) may be determined according to the required cohesive force of the methacrylic polymer block (b) and the time required for polymerization thereof.

The cohesive force depends upon molecular interaction (i.e., polarity) and a degree of entanglement, and the number of entanglement sites increases to increase the cohesive force as the number-average molecular weight increases. Namely, assuming that the necessary number-average molecular weight of the methacrylic polymer block (b) is $M_B$, and the molecular weight of an entanglement strand of a polymer constituting the methacrylic polymer block (b) is $Mc_B$, an $M_B$ range is exemplified by the following. When cohesive force is required, $M_B > Mc_B$ is preferred, and when cohesive force is further required, $M_B > 2 \times Mc_B$ is preferred. Conversely, when certain degrees of cohesive force and creep property are satisfied, $Mc_B < M_B < 2 \times Mc_B$ is preferred. The molecular weight of the entanglement strand may be referred to the document of Wu et al., Polym. Eng. and Sci., 1990, Vo. 30, p. 753. For example, on the assumption that the methacrylic polymer block (b) entirely comprises methyl methacrylate, when cohesive force is required, the number-average molecular weight of the methacrylic polymer block (b) is preferably in the range of 9200 or more. However, when the unit (c) is contained in the methacrylic polymer block (b), the number-average molecular weight can be set to a lower value because the cohesive force of the unit (c) is imparted. Since the polymerization time tends to increase as the number-average molecular weight increases, the number-average molecular weight may be set to preferably 200,000 or less, and more preferably 100,000 or less, according to the required productivity.

Examples of a methacrylate which constitutes the methacrylic polymer block (b) include methacrylic acid aliphatic hydrocarbon (for example, alkyl having 1 to 18 carbon atoms) esters such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, stearyl methacrylate, and the like; methacrylic acid alicyclic hydrocarbon esters such as cyclohexyl methacrylate, isobornyl methacrylate, and the like; methacrylic acid aralkyl esters such as benzyl methacrylate, and the like; methacrylic acid aromatic hydrocarbon esters such as phenyl methacrylate, tolyl methacrylate, and the like; esters of methacrylic acid and functional group-containing alcohols having ether oxygen, such as 2-methoxyethyl methacrylate, 3-methoxybutyl methacrylate, and the like; methacrylic acid fluoroalkyl esters such as trifluoromethylmethyl methacrylate, 2-trifluoromethylethyl methacrylate, 2-perfluoroethylethyl methacrylate, 2-perfluoroethyl-2-perfluorobutylethyl methacrylate, 2-perfluoroethyl methacrylate, perfluoromethyl methacrylate, diperfluoromethylmethyl methacrylate, 2-perfluoromethyl-2-perfluoroethylmethyl methacrylate, 2-perfluorohexylethyl methacrylate, 2-perfluorodecylethyl methacrylate, 2-perfluorohexadecylethyl methacrylate, and the like. These methacrylates may be used singly or in a combination of at least two methacrylates. Particularly, methyl methacrylate is preferred from the viewpoint of compatibility in combination with a thermoplastic resin, cost and availability.

Examples of the vinyl monomer copolymerizable with the methacrylate which constitutes the methacrylic polymer block (b) include acrylates, aromatic alkenyl compounds, vinyl cyanide compounds, conjugated diene compounds, halogen-containing unsaturated compounds, unsaturated dicarboxylic acid compounds, vinyl ester compounds, maleimide compounds, and the like.

Examples of the acrylates include the same monomers as those described above for the acrylic polymer block (a).

Examples of the aromatic alkenyl compounds, the vinyl cyanide compounds, the conjugated diene compounds, the halogen-containing unsaturated compounds, the unsaturated dicarboxylic acid compounds, the vinyl ester compounds, and the maleimide compounds include the same monomers as those described above for the acrylic polymer block (a).

As the copolymerizable vinyl monomer, at least one of the above constituent monomers is used. The vinyl monomer is preferably selected from the viewpoint of compatibility in a combination of the acrylic block copolymer and the polyorganosiloxane-containing graft polymer (B). A methyl methacrylate polymer is substantially quantitatively depolymerized by thermal decomposition. However, in order to suppress depolymerization, the polymer can be copolymerized with an acrylate, for example, methyl acrylate, ethyl acrylate, n-butyl acrylate, 2-methoxyethyl acrylate, or a mixture thereof, or styrene. Furthermore, the polymer can be copolymerized with acrylonitrile for improving oil resistance.

The glass transition temperature of the methacrylic polymer block (b) is preferably 100° C. or more, and more preferably 110° C. or more. With the glass transition temperature of less than 100° C., rubber elasticity at high temperature decreases to a value lower than a desired value in some cases.

The glass transition temperature (Tg) of the methacrylic polymer block (b) can be controlled by changing the ratio of each of the monomers which constitute the polymer block, according to the Fox equation. The glass transition temperature is determined according to the Fox equation using the polymerization ratio of each of the monomers which constitute the polymer block, and a value described in "Polymer Handbook Third Edition" as the glass transition temperature of a homopolymer of each monomer.

(Unit (c))

The unit (c) has reactivity to a compound having an amino group, a hydroxyl group, an epoxy group, or the like, and thus has the characteristic that it can be used as a reactive site of modification of the polymer, a compatibility improvement site in blending with a polyorganosiloxane-containing graft polymer, a thermoplastic resin and/or a thermoplastic elastomer, and a crosslinking site in application of further rubber elasticity to a soft segment. Also, since the unit (c) has a high glass transition temperature (Tg), it can improve the heat resistance of the block copolymer (A) when being introduced into a hard segment. For example, the glass transition temperature (Tg) of a polymer containing the unit (c), for example, polymethacrylic acid anhydride, is as high as 159° C., and thus the heat resistance of the block copolymer (A) can be improved when the unit (c) is introduced therein.

The unit (c) comprises the unit (c1) containing an acid anhydride group and the unit (c2) containing a carboxyl group represented by formula (1):

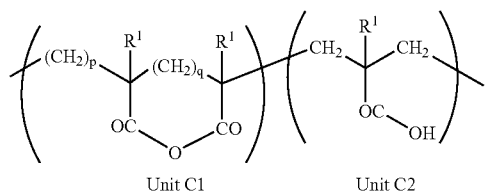

Unit C1          Unit C2

(wherein $R^1$ each represent a hydrogen atom or a methyl group and may be the same or different, p is an integer of 0 or 1, and q is an integer of 0 to 3).

In formula (1), q is an integer of 0 to 3, preferably 0 or 1, and more preferably 1. When q is over 3, polymerization is complicated, and cyclization to an acid anhydride group becomes difficult in some cases.

In formula (1), p is an integer of 0 or 1, and p is preferably 0 when q is 0, and preferably 1 when q is an integer of 1 to 3. The unit (c) is contained in the acrylic polymer block (a) and/or the methacrylic polymer block (b). The introduction site of the unit (c) can be appropriately selected according to the reactive sites of the acrylic block copolymer, the cohesive force and glass transition temperatures of the blocks constituting the acrylic block copolymer, and the required physical properties of the acrylic block copolymer. From the viewpoint of improvement in heat resistance and thermal decomposition resistance of the acrylic block copolymer, the unit (c) is preferably introduced into the methacrylic polymer block (b), and from the viewpoint of application of rubber elasticity to the acrylic block copolymer, the unit (c) is preferably introduced as a crosslinking reactive site (crosslinking point) into the acrylic polymer block (a). From the viewpoint of control of the reactive site, heat resistance and rubber elasticity, the unit (c) is preferably contained in one of the acrylic polymer block (a) and the methacrylic polymer block (b). When the unit (c) is contained in the methacrylic polymer block (b), all $R^1$ groups in formula (1) are preferably methyl groups, while when the unit (c) is contained in the acrylic polymer block (a), $R^1$ in formula (1) is preferably a hydrogen atom. When $R^1$ of the unit (c) contained in the methacrylic polymer block (b) is a hydrogen atom, or when $R^1$ of the unit (c) contained in the acrylic polymer block (a) is a methyl group, the polymerization operation of the acrylic block copolymer is complicated, and a difference between the glass transition temperatures of the acrylic polymer block (a) and the methacrylic polymer block (b) is liable to decrease to decrease the rubber elasticity of the acrylic block copolymer.

A preferred range of the content of the unit (c) depends upon the cohesive force and reactivity of the unit (c), the structure and composition of the acrylic block copolymer, the number of the blocks constituting the acrylic block copolymer and the glass transition temperature thereof, and the introduction sites and states of the acid anhydride group-containing unit (c1) and the carboxyl group-containing unit (c2). The preferred range of the content also depends upon the reactivity and reactive sites to the polyorganosiloxane-containing graft polymer (B). The content of the unit (c) is preferably 0.1 to 99.9 percent by weight, more preferably 0.5 to 80 percent by weight, and most preferably 0.5 to 60 percent by weight, on the basis of the entirety or the acrylic block copolymer. When the content of the unit (c) is less than 0.1 percent by weight, the reactivity of the acrylic block copolymer becomes insufficient in some cases. Also, when less than 0.1 percent by weight of the unit (c) having high Tg is introduced into the methacrylic polymer block (b) which is a hard segment, for improving the heat resistance of the methacrylic polymer block (b), the heat resistance is not sufficiently improved, and the expression of rubber elasticity at a high temperature is decreased in some cases. On the other hand, when the content of the unit (c) exceeds 99.9 percent by :weight, the cohesive force is excessively increased to decrease workability in some cases.

From the viewpoint of further improvement in heat resistance and cohesive force, the acrylic block copolymer may contain the unit (c2) having a carboxyl group. The unit (c2) having a carboxyl group has strong cohesive force, and a polymer of a monomer having a carboxyl group has a high glass transition temperature (Tg). For example, polymethacrylic acid has a glass transition temperature (Tg) of as high as 228° C., and improves the heat resistance of the acrylic block copolymer. Although a functional group such as a hydroxyl group or the like has a hydrogen bonding ability, a monomer having such a functional group has low Tg and exhibits the low effect of improving heat resistance, as compared with a monomer having the above functional group. Therefore, the acrylic block copolymer preferably contains the unit (c2) having a carboxyl group because the heat resistance and cohesive force of the acrylic block copolymer can be further improved. The acrylic block copolymer preferably contains 0.1 to 50 percent by weight of the unit (c2) having a carboxyl group on the basis of the entirety of the acrylic block copolymer because the heat resistance can be improved.

The method for introducing the unit (c) comprising the unit (c1) having an acid anhydride group and/or the unit (c2) having a carboxyl group into the acrylic block copolymer will be described below.

The method for introducing the unit (c1) having an acid anhydride group is not particularly limited, and a preferred method comprises introducing a unit containing a group functioning as a precursor of an acid anhydride group into the acrylic block copolymer, and then cyclizing the unit. The method will be described in detail below.

Namely, the unit (c1) can be introduced by a cyclization method in which a block copolymer having at least one unit represented by formula (2), i.e., an acrylic block copolymer composition having any one of the monomers described below as examples of the acrylate constituting the acrylic polymer block (a), is melt-kneaded preferably at a temperature of 180 to 300° C.

Formula (2):

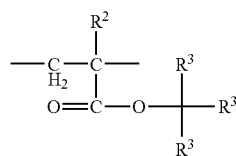

(wherein $R^2$ represents a hydrogen atom or a methyl group, and $R^3$ each represent a hydrogen atom, a methyl group or a phenyl group and may be the same or different as long as at least one of the $R^3$ groups is a methyl group). With a temperature lower than 180° C., an acid anhydride group is not sufficiently produced in some cases, while with a temperature higher than 300° C., the acrylic block copolymer composition having any one of the monomers described below as examples of the acrylate constituting the acrylic polymer block (a) is decomposed in some cases.

The unit represented by formula (2) produces, for example, a six-member ring acid anhydride group by elimination and cyclization of adjacent ester units at high temperature (refer to, for example, Hatada, et al., J. M. S. PURE APPL. CHEM., A30 (9&10), PP. 64.5-667 (1993)). This document teaches that a polymer having a bulk ester unit and β-hydrogen generally produces a carboxyl group by decomposition of an ester unit at a high temperature and causes cyclization to produce, for example, a six-member ring acid anhydride group. By using the above method, an acid anhydride group can easily be introduced into the acrylic block copolymer. Examples of the monomer constituting the unit shown by formula (2) include t-butyl acrylate, isopropyl acrylate, α,α-dimethylbenzyl acrylate, α-methylbenzyl acrylate, t-butyl methacrylate, isopropyl methacrylate, α,α-dimethylbenzyl methacrylate, α-methylbenzyl methacrylate, and the like. However, the monomer is not limited to these examples. Among these monomers, t-butyl acrylate and t-butyl methacrylate are preferred from the viewpoint of availability, ease of polymerization and ease of the formation of an acid anhydride group.

Various methods can be applied to the introduction of the unit (c2) having a carboxyl group, and the introduction method is not particularly limited. In the process for introducing the unit (c1) containing an acid anhydride group into the acrylic block copolymer, the heating temperature and time are preferably appropriately controlled according to the type and content of the unit represented by formula (2), for producing the unit (c2) containing a carboxyl group. This is because the reactive sites of the acrylic block copolymer can easily be controlled, and the unit (c2) containing a carboxyl group can easily be introduced into the acrylic block copolymer.

<Production of Acrylic Block Copolymer>

Although the production method is not particularly limited, controlled polymerization is preferably used. Examples of controlled polymerization include living anion polymerization, radical polymerization using a chain transfer agent, and living radical polymerization which has recently been developed. The living radical polymerization is preferred from the viewpoint of the molecular weight and structure control of the block copolymer and the ability to copolymerize a monomer having a crosslinking functional group.

In a restricted sense, the living polymerization means polymerization in which a terminal constantly maintains activity. However, the living polymerization generally includes pseudo living polymerization in which an inactivated terminal is in equilibrium with an activated terminal. In the present invention, the living polymerization is radical polymerization in which an activated polymerization terminal is maintained in equilibrium with an inactivated terminal, and which has recently positively researched by various groups.

Examples of the radical polymerization include polymerization using a chain transfer agent such as polysulfide or the like; polymerization (Macromolecules, 1994, 27, 7228) using a radical scavenger such as a cobalt porphyrin complex (Journal of American Chemical Society, 1994, 116, 7943), a nitroxide compound, or the like; atom transfer radical polymerization (ATRP) using an organic halogen compound as an initiator and a transition metal complex as a catalyst; and the like. In the present invention, the polymerization method is not particularly limited, and atom transfer radical polymerization is preferred from the viewpoint of ease of control.

The atom transfer radical polymerization uses an organic halogen compound or a sulfonyl halide compound as the initiator, and a metal complex mainly composed of a metal of the VIII-, IX-, X- or XI-group elements of the periodic table as a catalyst (for example, Matyjaszewski et al., Journal of American Chemical Society, 1995, 117, 5614, Macromolecules, 1995, 28, 7901, Science, 1996, 272, 866 or Sawamoto et al., Macromolecules, 1995, 28, 1721).

In this method, radical polymerization generally has a high rate of polymerization, and easily produces a termination reaction such as coupling of radicals. However, polymerization proceeds in a living manner and can produce a polymer having a narrow molecular-weight distribution Mw/Mn of about 1.1 to 1.5, and the molecular weight can be freely controlled by the ratio of the monomer to the initiator at the time of feeding.

In the atom transfer radical polymerization method, a monofunctional, difunctional or polyfunctional compound can used as an organic halogen compound or a sulfonyl halide compound functioning as the initiator. These compounds can be properly used according to the purposes. Namely, a monofunctional compound is preferably used for producing a di-block copolymer, a difunctional compound is preferably used for producing a x-y-x type tri-bock copolymer or a y-x-y type tri-block copolymer, and a polyfunctional compound is preferably used for producing a branched block copolymer.

Examples of the monofunctional compound include compounds represented by the following chemical formulae:

$C_6H_5-CH_2X$ $C_6H_5-CHX-CH_3$ $C_6H_5-C(CH_3)_2X$ $R^1-CHX-COOR^2$ $R^1-C(CH_3)X-COOR^2$ $R_1-CHX-CO-R^2$ $R^1-C(CH_3)X-CO-R^2$ $R^1-C_6H_4-SO_2X$

In the formulae, $C_6H_4$ represents a phenylene group which may be an ortho-, metha- or para-substituted group, $R^1$ represents a hydrogen atom, an alkyl group having 1 to 20 carbon atoms, an aryl group having 6 to 20 carbon atoms, or an aralkyl group having 7 to 20 carbon atoms, X represents chlorine, bromine, or iodine, and $R^2$ represents a monovalent organic group having 1 to 20 carbon atoms.

Examples of the difunctional compound include compounds represented by the following chemical formulae:

$X-CH_2-C_6H_4-CH_2-X$ $X-CH(CH_3)-C_6H_4-CH(CH_3)-X$ $X-C(CH_3)_2-C_6H_4-C(CH_3)_2-X$ $X-CH(COOR^3)-(CH_2)_n-CH(COOR^3)-X$ $X-C(CH_3)(COOR^3)-(CH_2)_n-C(CH_3)(COOR^3)-X$ $X-CH(COR^3)-(CH_2)-CH(COR^3)-X$ $X-C(CH_3)(COR^3)-(CH_2)_n-C(CH_3)(COR^3)-X$ $X-CH_2-CO-CH_2-X$ $X-CH(CH_3)-CO-CH(CH_3)-X$ $X-C(CH_3)_2-CO-C(CH_3)_2X$ $X-CH(C_6H_5)-CO-CH(C_6H_5)-X$ $X-CH_2-COO-(CH_2)_n-OCO-CH_2-X$ $X-CH(CH_3)-COO-(CH_2)_n-OCO-CH(CH_3)-X$ $X-C(CH_3)_2-COO-(CH_2)_n-OCO-C(CH_3)_2-X$ $X-CH_2-CO-CO-CH_2-X$ $X-CH(CH_3)-CO-CO-CH(CH_3)-X$ $X-C(CH_3)_2-CO-CO-C(CH_3)_2-X$ $X-CH_2-COO-C_6H_4-OCO-CH_2-X$ $X-CH(CH_3)-COO-C_6H_4-OCO-CH(CH_3)-X$ $X-C(CH_3)_2-COO-C_6H_4-OCO-C(CH_3)_2-X$ $X-SO_2-C_6H_4-SO_2-X$

In the formulae, $R^3$ represents an alkyl group having 1 to 20 carbon atoms, an aryl group having 6 to 20 carbon atoms, or an aralkyl group having 7 to 20 carbon atoms, $C_6H_4$ represents a phenylene group which may be an ortho-, metha- or para-substituted group, $C_6H_5$ represents a phenyl group, n represents an integer of 0 to 20, and X represents chlorine, bromine, or iodine.

Examples of the polyfunctional compound include compounds represented by the following chemical formulae:

$C_6H_3(CH_2X)_3$ $C_6H_3(CH(CH_3)-X)_3$ $C_6H_3(C(CH_3)_2-X)_3$ $C_6H_3(OCO-CH_2X)_3$ $C_6H_3(OCO-CH(CH_3)-X)_3$ $C_6H_3(OCO-C(CH_3)_2-X)_3$ $C_6H_3(SO_2X)_3$

In the formulae, $C_6H_3$ represents a tri-substituted phenyl group having substituents at any of the 1-position to 6-position, and X represents chlorine, bromine or iodine.

In the organic halogen compound or sulfonyl halide compound which can be used as the initiator, a carbon atom bonding to halogen bonds to a carbonyl group or a phenyl group, and a carbon-halogen bond is activated to initiate polymerization. The amount of the initiator used may be determined by the ratio to the monomer according to the required molecular weight of the block copolymer. Namely, the molecular weight of the block copolymer can be controlled by controlling the number of the monomer molecules used per molecule of the initiator.

Although the transition metal complex used as the catalyst for the atom transfer radical polymerization is not particularly limited, a complex of monovalent or zerovalent copper, divalent ruthenium, divalent iron or divalent nickel can be preferably used. Particularly, a copper complex is preferred from the viewpoint of cost and reaction control.

Examples of a monovalent copper compound include cuprous chloride, cuprous bromide, cuprous iodide, cuprous cyanide, cuprous oxide, cuprous perchlorate, and the like. In the use of a copper compound, a polyamine such as 2,2'-bipyridyl or its derivative, 1,10-phenanthroline or its derivative, tetramethylethylenediamine (TMEDA), pentamethyldiethylenetriamine, hexamethyl (2-aminoethyl)amine, or the like can be added as a ligand for increasing catalytic activity. Also, a tristriphenylphosphine complex ($RuCl_2(PPh_3)_3$) of divalent ruthenium chloride can be used as the catalyst.

In the use of a ruthenium compound as the catalyst, an aluminum alkoxide may be added as an activator. Furthermore, a bistriphenylphosphine complex of divalent iron ($FeCl_2(PPh_3)_2$), a bistriphenylphosphine complex of divalent nickel ($NiCl_2(PPh_3)_2$), and bistributylphosphine complex of divalent nickel ($NiBr_2(PBu_3)_2$) can be used as the catalyst.

Although the amounts of the catalyst, ligand and activator used are not particularly limited, the amounts can be determined according to the amounts of the initiator, monomer and solvent used and the required reaction rate.

The atom transfer radical polymerization can be performed in any of various solvents or without using a solvent (bulk polymerization). Examples of the solvent include hydrocarbon solvents such as benzene, toluene, and the like; halogenated hydrocarbon solvents such as methylene chloride, chloroform, and the like; ketone solvents such as acetone, methyl ethyl ketone, methyl isobutyl ketone, and the like; alcohol solvents such as methanol, ethanol, propanol, isopropanol, n-butanol, t-butanol, and the like; nitrile solvents such as acetonitrile, propionitrile, benzonitrile, and the like; ester solvents such as ethyl acetate, butyl acetate, and the like; carbonate solvents such as ethylene carbonate, propylene carbonate, and the like. A mixture of at least one of these solvents may be used. In the use of the solvent, the amount of the solvent used can be appropriately determined according to the viscosity of the entirety system and the required reaction rate (i.e., stirring efficiency).

The atom transfer radical polymerization can be performed preferably in a range of room temperature to 200° C., and more preferably 50 to 150° C. With the atom transfer radical polymerization temperature lower than room temperature, the viscosity becomes excessively high to decrease the reaction rate in some cases, while with the polymerization temperature of over 200° C., an inexpensive polymerization solvent cannot be used in some cases.

Examples of the method for producing the block copolymer by the atom transfer radical polymerization include a method comprising consecutively adding monomers, a method using a previously synthesized polymer as a polymer initiator for next block polymerization, a method comprising effecting a reaction for bonding polymers which are separately polymerized, and the like. These methods can be properly used according to the purposes. From the viewpoint of ease of the production process, the method comprising consecutively adding monomers is preferred.

<Polyorganosiloxane-containing Graft Polymer (B)>

The polyorganosiloxane-containing graft polymer (B) used in the present invention will be described below. The polyorganosiloxane-containing graft polymer is mixed with and dispersed in the acrylic elastomer used as a matrix resin of the composition of the present invention. The polyorganosiloxane-containing graft polymer is not broken by embrittlement and can exhibit good low-temperature characteristics even at a temperature lower than the brittle temperature of the acrylic elastomer used as the matrix resin. Also, the polyorganosiloxane-containing graft polymer can exhibit the effect of improving low-temperature characteristics such as low-temperature elastic recovery (TR characteristic) and low-temperature torsional performance (Gehman torsional performance), and can improve the low-temperature elastic recovery temperature and tensile permanent deformation at low temperatures. Furthermore, various characteristics (formability such as a mold release property and the like, sliding performance, flame resistance, and the like), which can be originally exhibited by polyorganosiloxane, can be imparted.

Although the composition of the polyorganosiloxane-containing graft polymer (B) is not particularly limited, it is preferably a copolymer produced by polymerizing 0 to 10 percent by weight of a monomer (d2) in the presence of 40 to 95 percent by weight of polyorganosiloxane (d1), and then further polymerizing 5 to 60 percent by weight of a vinyl monomer (d3) (a total of 100 percent by weight of (d1), (d2) and (d3)). The monomer (d2) comprises 50 to 100 percent by weight of a polyfunctional monomer (x) containing two or more polymerizable unsaturated bonds in its molecule, and 0 to 50 percent by weight of another copolymerizable vinyl monomer (y).

Furthermore, the polyorganosiloxane-containing graft polymer (B) preferably comprises a total of 5 to 40 percent by weight of graft components including the monomer (d2) and the vinyl monomer (d3), and 95 to 60 percent by weight of the polyorganosiloxane.

The method for producing the polyorganosiloxane (d1) used in the present invention is not particularly limited, and the polyorganosiloxane (d1) can be produced by usual emulsion polymerization. However, seed polymerization can be used because of the advantage that a particle size distribution in a latex state can be narrowed. The seed polymer used in seed polymerization is not limited to rubber components such as butyl acrylate rubber, butadiene rubber, butadiene-styrene rubber, butadiene-acrylonitrile rubber, and the like, and polymers such as butyl acrylate-styrene copolymers, styrene-acrylonitrile copolymers, and the like may be used. Also, a chain transfer agent may be used for polymerization of the seed polymer. Furthermore, a graft-crossing agent, and if required, a crosslinking agent, may be used for polymerization of the polyorganosiloxane (d1).

Specifically, the organosiloxane used has a structural unit represented by the formula $R_m SiO_{(4-m)/2}$ (wherein R represents a substituted or unsubstituted monovalent hydrocarbon group, and m represents an integer of 0 to 3). Although the organosiloxane may have a linear, branched or cyclic structure, the organosiloxane having a cyclic structure is preferred from the viewpoint of availability and cost. Examples of the substituted or unsubstituted monovalent hydrocarbon group possessed by the organosiloxane include a methyl group, an ethyl group, a propyl group, a phenyl group, a substituted hydrocarbon group substituted by a cyano group or the like, and the like. Examples of the organosiloxane include cyclic compounds such as hexamethylcyclotrisiloxane (D3), octamethylcyclotetrasiloxane (D4), decamethylcyclopentasiloxane (D5), dodecamethylcyclohexasiloxane (D6), trimethyltriphenylcyclotrisiloxane, and the like; linear or branched organosiloxanes, and the like. At lease one of these organosiloxanes may be used.

Examples of the graft-crossing agent which can be used in the present invention include p-vinylphenylmethyldimethoxysilane, p-vinylphenylethyldimethoxysilane, 2-(p-vinylpheny)ethylmethyldimethoxysilane, 3-(p-vinylbenzoyloxy)propylmethyldimethoxysilane, p-vinylphenylmethyldimethoxsilane, vinylmethyldimethoxysilane, tetravinyltetramethylcyclohexane, allylmethyldimethoxysilane, mercaptopropylmethyldimethoxysilane, methacryloxypropylmethyldimethoxysilane, and the like. The ratio of the graft-crossing agent used is preferably 0.1 to 10 percent by weight relative to the organosiloxane. When the amount of the graft-crossing agent used exceeds 10 percent by weight, the impact resistance of a final molded product deteriorates in some cases, while when the amount of the graft-crossing agent used is less than 0.1 percent by weight, a large lump is produced in solidification and heat treatment to fail to obtain a normal resin powder and cause deterioration in the formability of the final molded product in some cases.

If required, a crosslinking agent can be added in synthesizing the polyorganosiloxane (d1) used in the present invention. Examples of the crosslinking agent include trifunctional crosslinking agents such as methyltrimethoxysilane, phenyltrimethoxysilane, ethyltriethoxysilane, and the like; tetrafunctional crosslinking agents such as tetraethoxysilane, 1,3-bis[2-(dimethoxymethylsilyl)ethyl]benzene, 1,4-bis[2-(dimethoxymethylsilyl)ethyl]benzene, 1,3-bis[1-(dimethoxymethylsilyl)ethyl]benzene, 1,4-bis[1-(dimethoxymethylsilyl)ethyl]benzene, 1-[1-(dimethoxymethylsilyl)ethyl]-3-[2-(dimethoxymethylsilyl)ethyl]benzene, 1-[1-(dimethoxymethylsilyl)ethyl]-4-[2-dimethoxymethylsilyl]ethyl]benzene, and the like. At least one of these, crosslinking agents can be used. The amount of the crosslinking agent added is preferably 0.1 to 10 parts by weight relative to 100 parts by weight of the organosiloxane. When the amount of the crosslinking agent added is more than 10 parts by weight, the flexibility of the polyorganosiloxane (d1) deteriorates to decrease the low-temperature impact resistance of a rubber material obtained from the acrylic elastomer composition in some cases.

The mean particle diameter of the polyorganosiloxane (d1) in a latex state is preferably 0.008 to 0.6 μm, and more preferably 0.08 to 0.4 μm. With a mean particle diameter of less than 0.008 μm, it is difficult to stably obtain the polyorganosiloxane (d1), while with a mean particle diameter of over 0.6 μm, the impact resistance of the final molded product deteriorates in some cases.

Examples of the polyfunctional monomer (x) include allyl methacrylate, ethylene glycol dimethacrylate, 1,3-butylene glycol dimethacrylate, divinylbenzene, and the like. At least one of these monomers can be used.

Examples of the copolymerizable monomer (y) include aromatic vinyl monomers such as styrene, α-methylstyrene, and the like; vinyl cyanide monomers such as acrylonitrile, and the like; (meth)acrylate monomers such as methyl acrylate, ethyl acrylate, methyl methacrylate, ethyl methacrylate, butyl methacrylate, and the like; vinyl monomers each containing an epoxy group in its molecule, such as glycidyl methacrylate, and the like. At least one of these monomers can be used.

The monomer (d2) comprising the polyfunctional monomer (x) and the copolymerizable monomer (y) has the function to permit powdering of a graft polymer resin, particularly, when the content of the polysiloxane (d1) in the polyorganosiloxane-containing graft polymer (B) is not less than 80 percent by weight. The monomer (d2) preferably comprises 50 to 100 percent by weight, more preferably 90 to 100 percent by weight, of the polyfunctional monomer (x), and 0 to 50 percent by weight, more preferably 0 to 10 percent by weight, of the copolymerizable monomer (y).

The amount of the monomer (d2) used in the polyorganosiloxane-containing graft polymer (B) is preferably 0 to 10 percent by weight, more preferably 0.5 to 10 percent by weight. Although the condition of a powder is more improved as the using amount increases, the impact resistance of the final molded product deteriorates in some cases when the using amount exceeds 10 percent by weight.

The vinyl monomer (d3) used in the present invention is a component used for securing compatibility between the polyorganosiloxane-containing graft polymer (B) and the acrylic elastomer (A) and for uniformly dispersing the polyorganosiloxane-containing graft polymer (B). Examples of the vinyl monomer (d3) include the same monomers as those of the other copolymerizable monomer (y). Namely, the examples include aromatic vinyl monomers such as styrene, α-methylstyrene, and the like; vinyl cyanide monomers such as acrylonitrile, and the like; (meth)acrylate monomers such as methyl acrylate, ethyl acrylate, propyl acrylate, butyl acrylate, methyl methacrylate, ethyl methacrylate, butyl methacrylate, and the like; vinyl monomers each containing epoxy group in its molecule, such as glycidyl methacrylate, and the like; ethylenic unsaturated carboxylic acids such as methacrylic acid, acrylic acid, and the like. At least one of these monomers can be used. The vinyl monomer (d3) is preferably selected so that the solubility parameter of a polymer obtained by polymerizing the vinyl monomer (d3) is close to the solubility parameter of the acrylic elastomer used as the matrix resin. When the monomer (d3) is selected so that the solubility parameter of a polymer obtained by polymerizing the vinyl monomer (d3) is close to the solubility parameter of the acrylic elastomer used as the matrix resin, the polyorganosiloxane-containing graft copolymer has excellent dispersibility in the acrylic elastomer, thereby greatly improving the low-temperature characteristics of the molded product. On the other hand, when both solubility parameters are greatly different, the polyorganosiloxane-containing graft copolymer has low dispersibility, and the dispersed polyorganosiloxane-containing graft polymer possibly re-coagulates, thereby causing difficulty in imparting the excellent low-temperature characteristics by the polyorganosiloxane-containing graft copolymer.

In the entirety of the polyorganosiloxane-containing graft polymer (B), the entirety of the graft components of the polyorganosiloxane-containing graft polymer preferably contain 5 to 99.5 percent by weight of an alkyl methacrylate, and 95 to 0.5 percent by weight of an alkyl acrylate. When the content of an alkyl methacrylate is more than 99.5 percent by weight, heat resistance deteriorates due to thermal decomposition in some cases. When the acrylic elastomer is an acrylic block copolymer, the alkyl methacrylate component of the entirety of the graft components preferably contains 0.5 to 50 percent by weight of n-butyl methacrylate as an essential component on the basis of the entirety of the graft components of the polyorganosiloxane-containing graft polymer, for bringing the solubility parameter close to that of the acrylic block copolymer. When the heat resistance is required, the polyorganosiloxane-containing graft polymer preferably contains 0.5 to 10 percent by weight of methacrylic acid or acrylic acid on the basis of the entirety of the graft components.

Examples of the radical initiator used for producing the polyorganosiloxane (d1) in the present invention include organic peroxides such as cumene hydroperoxide, t-butyl hydroperoxide, benzoyl peroxide, t-butyl peroxyisopropyl carbonate, and the like; inorganic peroxides such as potassium persulfate, ammonium persulfate, and the like; azo compounds such as 2,2'-azobisisobutyronitrile, 2,2'-azobis-2,4-dimethyl valeronitrile, and the like. When the polymerization is effected in a redox system comprising ferrous sulfate-sodium formaldehyde sulfoxylate-ethylenediamine tetraacetic acid.2Na salt, ferrous sulfate-glucose-sodium pyrophosphate, ferrous sulfate-sodium pyrophosphate-sodium phosphate, or the like, the polymerization is completed even at a low polymerization temperature.

The method for isolating a polymer from a latex of the polyorganosiloxane-containing graft copolymer (B) obtained by emulsion polymerization is not particularly limited. For example, a metal salt such as calcium chloride, magnesium chloride, magnesium sulfate, or the like is added to the latex to coagulate the latex, and separation, water washing, dehydration, and drying are then performed. Also, a spray drying method can be used.

With respect to the contents of the acrylic elastomer (A) and the polyorganosiloxane-containing graft polymer (B), the content of the acrylic elastomer (A) is 50 to 98 percent by weight, and the content of the polyorganosiloxane-containing graft polymer (B) is 50 to 2 percent by weight, on the basis of the entirety of the acrylic elastomer composition. When the content of the polyorganosiloxane-containing graft polymer (B) is more than 50 percent by weight, oil resistance deteriorates in some cases, while when the content is less than 2 percent by weight, the low-temperature characteristics are not sufficiently improved in some cases.

<Crosslinking Agent>

In the present invention, when the acrylic elastomer (A) is the acrylic rubber, the crosslinking agent is used for crosslinking a crosslinkable monomer unit at a basic site to exhibit excellent rubber elasticity.

The crosslinking agent is properly selected according to the type of the crosslinkable unit of the acrylic rubber, for enabling effective crosslinking and obtaining crosslinked rubber having excellent compression permanent set. In the present invention, a wide range of known crosslinking agents can be used. For example, when the crosslinkable unit of the acrylic rubber contains active halogen, a polyamine carbamate, an organic carboxylic acid ammonium salt, an organic carboxylic acid alkali metal salt, or a sulfur compound is preferably used. When the crosslinkable unit contains an epoxy group, a polyamine carbamate, an organic carboxylic acid ammonium salt, a dithiocarbamate, an organic carboxylic acid alkali metal salt, or a sulfur compound is preferably used. When the crosslinkable unit contains an unsaturated double bond, sulfur, an organic peroxide, or the like is preferably used. However, the crosslinking agent is not limited to these compounds.

In the present invention, the amount of the crosslinking agent added is preferably 0.005 to 10 parts by weight, and more preferably 0.1 to 5 parts by weight, on the basis of a total of 100 parts by weight of the acrylic rubber and the polyorganosiloxane-containing graft polymer (B). With the adding amount of less than 0.005 parts by weight, crosslinking does not sufficiently proceed to fail to exhibit the effect of improving the physical properties in some cases, while with the adding amount of over 10 parts by weight, the physical properties deteriorate due to the influence of the remaining component of the crosslinking agent in some cases.

<Composition>

The elastomer composition of the present invention may contain a lubricant, an inorganic filler, and a thermoplastic resin. The mixing amounts of the lubricant, the inorganic filler, and the thermoplastic resin are preferably in the ranges of 0.1 to 10 parts by weight, 0.1 to 100 parts by weight, and 0.1 to 100 parts by weight, respectively, on the basis of 100 parts by weight of the acrylic elastomer (A).

Examples of the lubricant include fatty acids such as stearic acid, palmitic acid, and the like; fatty acid metal salts such as calcium stearate, zinc stearate, magnesium stearate, potassium palmitate, sodium palmitate, and the like; waxes such as polyethylene wax, polypropylene wax, montanoic acid wax, and the like; low-molecular-weight polyolefins such as low-molecular-weight polyethylene, low-molecular-weight polypropylene, and the like; polyorganosiloxanes such as dimethylpolysiloxane, and the like; octadecylamine; alkyl phosphates; fatty acid esters; amide lubricants such as ethylene bisstearamide, and the like; fluororesin powders such as tetrafluoroethylene resin, and the like; a molybdenum disulfide powder; a silicone resin powder; a silicone rubber powder; silica; and the like. However, the lubricant is not limited to these examples. These examples may be used singly or in a combination of at least two materials. Particularly, stearic acid, zinc stearate, calcium stearate, magnesium stearate, and stearylamide are preferred because of the excellent low friction property of a resin surface and excellent workability.

Examples of the inorganic filler include titanium oxide, zinc sulfide, zinc oxide, carbon black, calcium carbonate, calcium silicate, clay, kaolin, silica, mica powder, alumina, glass fibers, metal fibers, potassium titanate whisker, asbestos, wollastonite, mica, talc, glass flakes, milled fibers, metal powders, and the like. However, the inorganic filler is not limited to these examples. These examples may be used singly or in a combination of a plurality of materials. Particularly, silica is preferred because of the high elastic modulus, and carbon black and titanium oxide are preferred because they have weather resistance and can be used as a pigment.

Examples of the thermoplastic resin include poly(vinyl chloride) resins, polyethylene resins, polypropylene resins, cyclic olefin copolymer resins, poly(methyl methacrylate) resins, polystyrene resins, poly(phenylene ether) resins, polycarbonate resins, polyester resins, polyamide resins, polyacetal resins, poly(phenylene sulfide) resins, polysulfone resins, polyimide resins, poly(ether imide) resins, poly(ether ketone) resins, poly(ether ether ketone) resins, poly(amide imide) resins, imidized poly(methyl methacrylate) resins, and the like. These examples may be used singly or in a combination of at least two materials. Among these examples, a thermoplastic resin with high compatibility with the acrylic block copolymer is preferably used, and a thermoplastic resin having a functional group reactive to an acid anhydride group is more preferably used. Examples of the functional group reactive to an acid anhydride group include an amino group, a hydroxyl group, and the like. Examples of a thermoplastic resin having such a functional group include polyester resins, polyamide resins, and the like. Also, a thermoplastic resin having another functional group reactive to an acid anhydride group can be preferably used.

The composition of the present invention may further contain stabilizers (an antioxidant, a light stabilizer, an ultraviolet absorber, and the like), a flexibility imparting agent, a flame retardant, a mold release agent, an antistatic agent, an antibacterial antifungal agent, and the like. These additives may be property selected according to the required physical properties and workability.

Although examples of the stabilizers (an antioxidant, a light stabilizer, an ultraviolet absorber, and the like) include the following compounds, the stabilizers are not limited to these examples.

Examples of the antioxidant include amine antioxidants such as phenyl α-naphthylamine (PAN), octyldiphenylamine, N,N'-diphenyl-p-phenylenediamine (DPPD), N,N'-di-β-naphthyl-p-phenylenediamine (DNPD), N-(1,3-dimethyl-butyl)-N'-phenyl-p-phenylenediamine, N-phenyl-N'-isopropyl-p-phenylenediamine (IPPN), N,N'-diallyl-p-phenylenediamine, phenothiazine derivatives, diallyl-p-phenylenediamine mixtures, alkylated phenylenediamine, 4,4'-α,α-dimethylbenzyldiphenylamine, p,p-toluenesufonyl aminodiphenylamine, N-phenyl-N'-(3-methacryloxy-2-hydropropyl)-p-phenylenediamine, diallyphenylenediamine mixtures, diallyl-p-phenylenediamine mixtures, N-(1-methylheptyl)-N-phenyl-p-phenylenediamine, diphenylamine derivatives, and the like; imidazole antioxidants such as 2-mercaptobenzoimidazole (MBI), and the like; phenol antioxidants such as 2,6-di-t-butyl-4-methylphenol, and the like; phosphate antioxidants such as nickel diethyl-dithiocarbamate, and the like; secondary antioxidants such as triphenyl phosphite, and the like.

Examples of the light stabilizer and the ultraviolet absorber include 4-t-butylphenyl salicylate, 2,4-dihydroxybenzophenone, 2,2'-dihydroxy-4-methoxybenzophenone, ethyl-2-cyano-3,3'-diphenyl acrylate, 2-ethylhexyl-2-cyano-3,3'-diphenyl acrylate, 2-hydroxy-5-chlorobenzophenone, 2-hydroxyl- 4-methoxybenzophenone-2-hydroxy-4-octoxybenzophenone, monoglycol salicylate, oxalic amide, 2,2',4,4'-tetrahydroxybenzophenone, and the like. These stabilizers may be used singly or in a combination of at least two stabilizers.

As the flexibility imparting agent, for example, a plasticizer, a softener, an oligomer, an oil (animal oil, vegetable oil, or the like), a petroleum fraction (kerosene, light oil, heavy oil, naphtha, or the like), or the like, which is generally mixed with a thermoplastic resin and rubber, can be used. However, the agent with excellent affinity to the acrylic elastomer (A) and the polyorganosiloxane-containing graft polymer (B) is preferably used. Particularly, a plasticizer having low volatility and a small heating loss, for example, an adipic acid derivative, a phthalic acid derivative, a glutaric acid derivative, a trimellitic acid derivative, a pyromellitic acid derivative, a polyester plasticizer, a glycerin derivative, an epoxy derivative polyester polymer plasticizer, a polyether polymer plasticizer, or the like, is preferably used.

Examples of the softener include process oils such as petroleum process oils, which include paraffinic oil, naphthenic process oil, aromatic process oil, and the like.

Examples of the plasticizer include phthalic acid derivative such as dimethyl phthalate, diethyl phthalate, di-n-butyl phthalate, di-(2-ethylhexyl)phthalate, diheptyl phthalate, diisodecyl phthalate, di-n-octyl phthalate, diisononyl phthalate, ditridecyl phthalate, octyldecyl phthalate, butylbenzyl phthalate, dicyclohexyl phthalate, and the like; isophthalic acid derivatives such as dimethyl isophthalate, and the like; tetrahydrophthalic acid derivatives such as di-(2-ethylhexyl) tetrahydrophthalate, and the like; adipic acid derivatives such as dimethyl adipate, dibutyl adipate, di-n-hexyl adipate, di-(2-ethylhexyl) adipate, dioctyl adipate, isononyl adipate, diisodecyl adipate, dibutyl diglycol adipate, and the like; azelaic acid derivatives such as di-2-ethylhexyl azelate, and the like; sebacic acid derivatives such as dibutyl sebacate, and the like; dodecanedioic acid derivatives; maleic acid derivatives such as dibutyl maleate, di-2-ethylhexyl maleate, and the like; fumaric acid derivatives such as dibutyl fumarate, and the like; p-oxybenzoic acid derivatives such as 2-ethylhexyl p-oxybenzoate, and the like; trimellitic acid derivative such as tris-2-ethylhexyl trimellitate, and the like; pyromellitic acid derivatives; citric acid derivatives such as acetyltributyl citrate, and the like; itaconic acid derivatives; oleic acid derivatives; ricinoleic acid derivatives; stearic acid derivatives; other fatty acid derivatives; sulfonic acid derivatives; phosphoric acid derivatives; glutaric acid derivatives; polyester plasticizers each comprising a polymer of a dibasic acid such as adipic acid, aseric acid, phthalic acid, or the like, glycol and a monovalent alcohol; glycol derivatives; glycerin derivatives; paraffin derivatives such as chlorinated paraffins and the like; epoxy derivative polyester polymer plasticizers; polyether polymer plasticizers; carbonate derivatives such as ethylene carbonate, propylene carbonate, and the like; benzenesulfonic acid derivatives such as N-butylbenzeneamide, and the like. However, the plasticizer is not limited to these examples, and various plasticizers commercially available as plasticizers for rubber or thermoplastic resins can be used.

Examples of commercially available plasticizers include Thiokol TP (produced by Morton Co., Ltd.), Adekacizer O-130P, C-79, UL-100, P-200, and RS-735 (produced by Asahi Denka Kogyo K. K.), Sansocizer N-400 (produced by New Japan Chemical Co., Ltd.), BM-4 (produced by Daihachi Chemical Industry Co., Ltd.), EHPB (Ueno Seiyaku K. K.), UP-1000 (produced by Toagosei Co., Ltd.), and the like.

Examples of oil include vegetable oils such as castor oil, cottonseed oil, linseed oil, rapeseed oil, soybean oil, palm oil, coconut oil, peanut oil, pine oil, tall oil, benne oil, camellia oil, and the like.

Other examples of the flexibility imparting agent include polybutene oil, spindle oil, machine oil, tricresyl phosphate, and the like.

Examples of the flame retardant include triphenyl phosphate, tricresyl phosphate, decabromobiphenyl, decabromobiphenyl ether, antimony trioxide, and the like. However, the flame retardant is not limited to these examples. These flame retardants may be used singly or in a combination of at least two compounds.

The composition of the present invention may further contain any one of various graft polymers and block polymers as a compatibilizer for improving compatibility between the acrylic elastomer (A) and the polyorganosiloxane-containing graft polymer (B).

Examples of the compatibilizer include commercial products such as Kraton Series (produced by Shell Japan Co., Ltd.), Tuftec Series (produced by Asahi Denka Kogyo K. K.), Dainaron (produced by Japan Synthetic Rubber Co., Ltd.), Epofriend (produced by Daicel Chemical Industries, Ltd.), Septon (produced by Kuraray Co., Ltd.), Nofalloy (produced by NOF Corporation), Rexpearl (Japan Polyolefins), Bondfast (produced by Sumitomo Chemical Co., Ltd.), Bondine (produced by Sumitomo Chemical Co., Ltd.), Admer (produced by Mitsui Chemicals, Inc.), Youmex (produced by Sanyo Chemical Industries, Ltd.), VMX (produced by Mitsubishi Chemical Corporation), Modiper (produced by NOF Corporation), Staphyloid (produced by Takada Chemical Industries), and Rezeta (produced by Toagosei Co., Ltd.). The compatibilizer can be appropriately selected from these compatibilizers according to combinations with the polyorganosiloxane-containing graft polymer (B) used for compensating the physical properties of the acrylic elastomer (A).

The method for producing the acrylic elastomer composition of the present invention is not particularly limited regardless of whether or not the composition contains the crosslinking agent. For example, when the composition comprises acrylic rubber as the acrylic elastomer, and the crosslinking agent, the composition can easily be produced by kneading predetermined amounts of the components with a mixer generally used for rubber kneading, such as a Banbury mixer, a kneader, an inter mixer, a two-roll mill, a plastomill, or the like.

The thus-obtained elastomer composition is molded into a shape by a molding method, for example, injection molding, heat press molding, or the like according to the purposes of molding, and then, if required, it is vulcanized to form a molded product. The vulcanization temperature is preferably 120° C. or more, and more preferably 140° C. to 180° C. Vulcanization is performed at this temperature for about 1 to 30 minutes. Also, after vulcanization may be performed at a temperature of about 150° C. to 180° C. for 1 to 48 hours for improving the physical properties according to demand.

Furthermore, when the acrylic elastomer composition does not contain the crosslinking agent for the acrylic rubber, the composition is preferably palletized before molding from the viewpoint of handling and kneading uniformity. The pelletization method will be described below.

The method for palletizing the composition of the present invention is not particularly limited. However, the resin composition can be formed into pellets by mechanical kneading with a known apparatus such as a Banbury mixer, a roll mill, a kneader, a single-screw or multi-screw extruder, or the like under heating at a proper temperature.

The kneading temperature may be controlled according to the melting temperatures of the acrylic elastomer (A), the polyorganosiloxane-containing graft polymer (B), the lubricant and/or the inorganic filler and/or the thermoplastic resin used. For example, the composition can be palletized by melt-kneading at 20° C. to 300° C.

The acrylic elastomer composition of the present invention can be used as a molded product. Molding can be performed by any desired molding method such as extrusion molding, compression molding, blow molding, calender molding, vacuum molding, foam molding, injection molding, injection blow molding, or the like. Among these molding methods, injection molding is preferred from the viewpoint of simplicity.

For example, in injection molding, the conditions for molding the resin composition of the present invention generally include a cylinder temperature of 150° C. to 240° C., a nozzle temperature of 240° C., a low injection rate, and a mold temperature of 40° C. to 120° C.

EXAMPLES

Although the composition of the present invention will be described in further detail below on the basis of examples, the present invention is not limited only to these examples.

Hereinafter, EA, BA, MEA, MMA, TBMA, TBA, HEA represent ethyl acrylate, butyl acrylate, 2-methoxyethyl acrylate, methyl methacrylate, t-butyl methacrylate, t-butyl acrylate, and 2-hydroxyethyl acrylate, respectively.

In the present invention, a molecular weight was determined in terms of polystyrene by GPC measurement using a GPC analyzer, chloroform as an eluent, and a polystyrene gel column.

<Measurement Method>

(Molecular Weight)

The molecular weight of the acrylic block copolymer was measured by a GPC analyzer (system: GPC system produced by Waters Corporation, column: Shodex K-804 (polystyrene gel) produced by Showa Denko Co., Ltd.). The molecular weight was determined in terms of polystyrene by using chloroform as an eluent.

(Analysis of Conversion to Six-Member Ring Acid Anhydride Group)

A conversion reaction into a six-member ring acid anhydride group of the acrylic block copolymer was confirmed by infrared spectroscopic analysis (using FTIR-8100 produced by Shimadzu Corporation) and nuclear magnetic resonance analysis (using AM400 produced by BRUKER Corporation).

As a solvent for nuclear magnetic resonance analysis, a carboxylic acid ester structure block was analyzed, together with a six-member ring acid anhydride structure block, by using deuterochloroform as the measurement solvent.

(Analysis of Acid Group Conversion)

A decomposition reaction of the block copolymer into carboxylic acid group-containing units was confirmed by infrared spectroscopic analysis (using FTIR-8100 produced by Shimadzu Corporation) and nuclear magnetic resonance analysis (using AM400 produced by BRUKER Corporation). As the solvent for nuclear magnetic resonance analysis, a carboxylic acid ester structure block was analyzed by using deuterochloroform as the measurement solvent, and a carboxylic acid-containing block was analyzed by using heavy methanol as the measurement solvent.

(Hardness)

Hardness (JIS A) at 23° C. was measured according to JIS K6301.

(Tensile Properties (Mechanical Strength))

The tensile properties were measured with Autograph AG-10TB model produced by Shimadzu Corporation according to the method described in JIS K7113. Measurement was carried out with n=3, and averages of strength (MPa) and elongation (%) at break of a test piece were determined. The test piece had a shape of No. 2(⅓) having a thickness of about 2 mm. Also, measurement was performed at 23° C. and a test rate of 500 mm/min. Before the measurement, the test piece was conditioned at a temperature of 23±2° C. and a relative humidity of 50±5% for 48 hours or more.

For a press-molded sheet, the direction of dumbbell punching was not specified. The direction of dumbbell punching for evaluating the tensile properties was perpendicular to the gate of an injection molded product.

(Compression Permanent Set)

According to JIS K6301, a cylindrical molded product was maintained at 100° C. for 22 hours with a compression rate of 25%, and then allowed to stand at room temperature for 30 minutes. Then, the thickness of the molded product was measured, and the degree of residual strain was calculated.

A compression permanent set of 0% means that strain is entirely recovered, and a compression permanent set of 100% means that strain is not at all recovered.

(Oil Resistance)

A molded product of the composition was immersed in ASTM oil No. 3 kept at 150° C. for 72 hours according to ASTM D638 to determine a rate of weight change (percent by weight). Also, the shape after immersion was evaluated on the basis of the following criteria:

Shape: maintained=○, slightly swollen=○ to Δ,
swollen=Δ, greatly swollen or partially
dissolved=x, completely dissolved=xx (Low-temperature Brittleness)

According to JIS K7216, a molded sheet of 2 mm in thickness was cut into a size of 38×6 mm, and a low-temperature brittle temperature was measured by using a low-temperature brittleness measuring meter "Standard model S (dry ice type)" (produced by Toyo Seiki Co., Ltd.) and a mixture of dry ice and methanol as a refrigerant.

(Method for Evaluating Low-temperature Elastic Recovery (TR Properties))

According to JIS K 6261,a predetermined test piece was cut out of a molded sheet product of 2 mm in thickness formed from the acrylic rubber composition by a predetermined method, and the low-temperature elastic recovery (TR properties) with an elongation of 50% was measured. TR 10 represents the recovery temperature of 10% deformation of the elongation, TR30 represents the recovery temperature of 30% deformation, TR50 represents the recovery temperature of 50% deformation, and TR70 represents the recovery temperature of 70% deformation.

(Method for Evaluating the Mold Release Property)

After press molding according to a predetermined method, ease of removal from a stainless sheet was evaluated on the basis of the following criteria:

○: easy removal
x: need of great force for removal

<Method for Producing Molded Product for Evaluation>

When the acrylic rubber was used as the acrylic elastomer, predetermined amounts of the acrylic rubber, polyorganosiloxane-containing graft polymer particles, and an antioxidant were melt-kneaded with a plastomill MODEL20C200 (produced by Toyo Seiki Co., Ltd.) under predetermined conditions (sample amount: 45 g, set chamber temperature: 23° C., pre-heating time: zero, screw rotational speed: 100 rpm, blade: biaxial roller type R60B, chamber volume: 60 cc, mixer: nitrided abrasion-resistant roller mixer R60HT, kneading time: 3 minutes). Furthermore, 1.5 parts by weight of ammonium benzoate serving as the crosslinking agent was added to 100 parts by weight of the acrylic rubber, and kneaded for 7 minutes under predetermined conditions (the same conditions as described above except that the rotational speed was changed to 50 rpm) to obtain a bulk sample. The resultant bulk sample was pressed by a pressing machine (produced by Shindo Kinzoku-Kogyosho Co., Ltd.) under predetermined conditions (pressing for 15 minutes at a pressing temperature of 170° C. and a pressing pressure of 5 MPa, and then cooling to 30° C. at 5 MPa) to obtain a molded sheet product having a thickness of 2 mm. Furthermore, the molded sheet product was annealed at 170° C. for a predetermined time, and then evaluated with respect to each of the items below.

<Examples of Production of Polyorganosiloxane-containing Graft Polymer>

Production Example 1

Synthesis of NM006

400 parts by weight of water and 12 parts by weight (solid content) of a 10% sodium dodecylbenzenesulfonate aqueous solution were mixed in a 5-necked flask with a stirrer, a reflux condenser, a nitrogen inlet, a monomer addition port, and a thermometer, and then the resultant mixture was heated to 50° C. After the temperature of the solution reached 50° C., the inside air of the flask was replaced with nitrogen. Then, 10 parts by weight of BA and 3 parts by weight of t-dodecylmercaptan were added to the mixture. 30 minutes after, 0.01 parts by weight (solid content) of para-menthan hydroperoxide, 0.3 parts of sodium formaldehyde sulfoxylate (SFS), 0.01 parts by weight of disodium ethylenediaminetetraacetate (EDTA), and 0.0025 parts by weight of ferrous sulfate were added to the mixture, and then stirred for 1 hour. Then, a mixture of 90 parts by weight of BA, 27 parts by weight of t-dodecylmercaptan, and 0.09 parts by weight (solid content) of para-menthan hydroperoxide was continuously added to the mixture over 3 hours. Then, postpolymerization was effected for 2 hours to obtain a latex containing a seed polymer.

Next, 2 parts by weight (solid content) of the seed polymer was charged in a 5-necked flask with a stirrer, a reflux condenser, a nitrogen inlet, a monomer addition port, and a thermometer. Then, a mixture containing 300 parts by weight (containing the water content of the latex containing the seed polymer) of pure water, 0.5 parts by weight (solid content) of a 5% sodium dodecylbenzenesulfonate aqueous solution, 98 parts by weight of octamethyl cyclotetrasiloxane, and 2 parts of mercaptopropylmethyl dimethoxysilane was stirred by a homomixer at 7000 rpm for 5 minutes to prepare an emulsion of a polyorganosiloxane forming component. The resultant emulsion was added to the flask at a time.

Next, 1 part by weight (solid content) of a 10% dodecylbenzenesulfonic acid aqueous solution was added to the resultant mixture, and then the system was heated to 80° C. under stirring in a nitrogen stream. After the temperature reached 80° C., stirring was continued at 80° C. for 10 hours, and then the mixture was cooled to 25° C. and allowed to stand for 20 hours. Then, the mixture was controlled to pH 6.5 with sodium hydroxide to terminate polymerization and obtain a latex containing polyorganosiloxane particles.

Then, 240 parts by weight (containing the water content of the latex containing the organosiloxane particles) of pure water, and 80 parts by weight (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts by weight of sodium formaldehyde sulfoxylate (SFS), 0.01 parts by weight of disodium ethylenediaminetetraacetate (EDTA), and 0.0025 parts by weight of ferrous sulfate were added to the resultant mixture. Then, a mixture of 1 part by weight of ally methacrylate and 0.01 parts by weight (solid content) of cumene hydroperoxide was added to the mixture at a time, and then stirred at 40° C. for 1 hour. Then, a mixture of 14 parts by weight of MMA, 6 parts by weight of BA, and 0.04 parts by weight (solid content) of cumene hydroperoxide was dropwisely added to the mixture over 1.5 hours. After the addition, stirring was further continued for 1 hour to obtain a latex of a polyorganosiloxane-containing graft polymer.

Then, the latex was diluted with pure water to a solid content of 15%, and 4 parts by weight (solid content) of a 25% calcium chloride aqueous solution was added to the latex to obtain coagulated slurry. Then, the coagulated slurry was heated to 85° C., cooled to 50° C., dehydrated and then dried to obtain a powder of the polyorganosiloxane-containing graft polymer.

Production Example 2

Synthesis of BTM002

Next, 2 parts by weight (solid content) of the seed polymer formed in Production Example 1 were charged in a 5-necked flask with a stirrer, a reflux condenser, a nitrogen inlet, a monomer addition port, and a thermometer. Then, a mixture containing 300 parts by weight (containing the water content of the latex containing the seed polymer) of pure water, 0.5 parts by weight (solid content) of a 5% sodium dodecylbenzenesulfonate aqueous solution, 98 parts by weight of octamethyl cyclotetrasiloxane, and 2 parts of methacryloxypropylmethyldimethoxysilane was stirred by a homomixer at 7000 rpm for 5 minutes to prepare an emulsion of a polyorganosiloxane forming component. The resultant emulsion was added to the flask at a time.

Next, 1 part by weight (solid content) of a 10% dodecylbenzenesulfonic acid aqueous solution was added to the resultant mixture, and then the system was heated to 80° C. under stirring in a nitrogen stream. After the temperature reached 80° C., stirring was continued at 80° C. for 10 hours, and then the mixture was cooled to 25° C. and allowed to stand for 20 hours. Then, the mixture was controlled to pH 6.5 with sodium hydroxide to terminate polymerization and obtain a latex containing polyorganosiloxane particles.

Then, 240 parts by weight (containing the water content of the latex containing the organosiloxane particles) of pure water, and 80 parts by weight (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts by weight of sodium formaldehyde sulfoxylate (SFS), 0.01 parts by weight of disodium ethylenediaminetetraacetate (EDTA), and 0.0025 parts by weight of ferrous sulfate were added to the resultant mixture. Then, a mixture of 14 parts by weight of MMA, 6 parts by weight of BA, and 0.04 parts by weight (solid content) of cumene hydroperoxide was dropwisely added to the mixture over 1.5 hours. After the addition, stirring was further continued for 1 hour to obtain a latex of a polyorganosiloxane-containing graft polymer.

Then, the latex was diluted with pure water to a solid content of 15%, and 4 parts by weight (solid content) of a 25% calcium chloride aqueous solution was added to the latex to obtain coagulated slurry. Then, the coagulated slurry was heated to 85° C., cooled to 50° C., dehydrated and then dried to obtain a powder of the polyorganosiloxane-containing graft polymer.

Production Example 3

Synthesis of BTM048

2 parts by weight (solid content) of the seed polymer formed in Production Example 1 were charged in a 5-necked flask with a stirrer, a reflux condenser, a nitrogen inlet, a monomer addition port, and a thermometer. Then, a mixture containing 300 parts by weight (containing the water content of the latex containing the seed polymer) of pure water, 0.5 parts by weight (solid content) of a 5% sodium dodecylbenzenesulfonate aqueous solution, 98 parts by weight of octamethyl cyclotetrasiloxane, and 3 parts of methacryloxypropylmethyldimethoxysilane was stirred by a homomixer at 7000 rpm for 5 minutes to prepare an emulsion of a polyorganosiloxane forming component. The resultant emulsion was added to the flask at a time.

Next, 1 part by weight (solid content) of a 10% dodecylbenzenesulfonic acid aqueous solution was added to the resultant mixture, and then the system was heated to 80° C. under stirring in a nitrogen stream. After the temperature reached 80° C., stirring was continued at 80° C. for 10 hours, and then the mixture was cooled to 25° C. and allowed to stand for 20 hours. Then, the mixture was controlled to pH 6.5 with sodium hydroxide to terminate polymerization and obtain a latex containing polyorganosiloxane particles.

Then, 240 parts by weight (containing the water content of the latex containing the organosiloxane particles) of pure water, and 80 parts by weight (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts by weight of sodium formaldehyde sulfoxylate (SFS), 0.01 parts by weight of disodium ethylenediaminetetraacetate (EDTA), and 0.0025 parts by weight of ferrous sulfate were added to the resultant mixture. Then, a mixture of 14 parts by weight of MMA, 6 parts by weight of EA, and 0.04 parts by weight (solid content) of cumene hydroperoxide was dropwisely added to the mixture over 1.5 hours. After the addition, stirring was further continued for 1 hour to obtain a latex of a polyorganosiloxane-containing graft polymer.

Then, the latex was diluted with pure water to a solid content of 15%, and 4 parts by weight (solid content) of a 25% calcium chloride aqueous solution was added to the latex to obtain coagulated slurry. Then, the coagulated slurry was heated to 85° C., cooled to 50° C., dehydrated and then dried to obtain a powder of the polyorganosiloxane-containing graft polymer.

Production Example 4

Synthesis of PM122

400 parts by weight of water and 12 parts (solid content) of a 10% sodium dodecylbenzenesulfonate aqueous solution were mixed in a 5-necked flask with a stirrer, a reflux condenser, a nitrogen inlet, a monomer addition port, and a thermometer, and then the resultant mixture was heated to 500C. After the temperature of the solution reached 50° C., the inside air of the flask was replaced with nitrogen. Then, 10 parts of BA and 3 parts of t-dodecylmercaptan were added to the mixture. 30 minutes after, 0.01 parts (solid content) of para-menthan hydroperoxide, 0.3 parts of sodium formaldehyde sulfoxylate (SFS), 0.01 parts of disodium ethylenediaminetetracetate (EDTA), and 0.0025 parts of ferrous sulfate were added to the mixture, and then stirred for 1 hour. Then, a mixture of 90 parts of BA, 27 parts of t-dodecylmercaptan, and 0.09 parts (solid content) of paramenthan hydroperoxide was continuously added to the mixture over 3 hours. Then, postpolymerization was effected for 2 hours to obtain a latex containing a seed polymer.

Next, 2 parts (solid content) of the seed polymer was charged in a 5-necked flask with a stirrer, a reflux condenser, a nitrogen inlet, a monomer addition port, and a thermometer. Then, a mixture containing 300 parts (containing the water content of the latex containing the seed polymer) of pure water, 0.5 parts (solid content) of a 5% sodium dodecylbenzenesulfonate aqueous solution, 98 parts of octamethyl cyclotetrasiloxane, and 2.9 parts of mercaptopropylmethyldimethoxysilane was stirred by a homomixer at 7000 rpm for 5 minutes to prepare an emulsion of polyorganosiloxane forming components. The resultant emulsion was added to the flask at a time. Next, 1 part (solid content) of a 10% dodecylbenzenesulfonic acid aqueous solution was added to the resultant mixture, and then the system was heated to 80° C. under stirring in a nitrogen stream. After the temperature reached 80° C., stirring was continued at 80° C. for 10 hours, and then the mixture was cooled to 25° C. and allowed to stand for 20 hours. Then, the mixture was controlled to pH 6.5 with sodium hydroxide to terminate polymerization and obtain a latex containing polyorganosiloxane particles.

Then, 240 parts (containing the water content of the latex containing the organosiloxane particles) of pure water, and 70 parts (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts of sodium formaldehyde sulfoxylate (SFS), 0.01 parts of disodium ethylenediaminetetraacetate (EDTA), and 0.0025 parts of ferrous sulfate were added to the resultant mixture. Then, a mixture of 1 part by weight of ally methacrylate and 0.01 parts (solid content) of cumene hydroperoxide was added to the mixture at a time, and then stirred at 40° C. for 1 hour. Then, a mixture of 24 parts of MMA, 6 parts of BA, and 0.06 parts (solid content) of cumene hydroperoxide was dropwisely added to the mixture over 1.5 hours. After the addition, stirring was further continued for 1 hour to obtain a latex of a graft copolymer.

Then, the latex was diluted with pure water to a solid content of 15%, and 4 parts (solid content) of a 25% calcium chloride aqueous solution was added to the latex to obtain coagulated slurry. Then, the coagulated slurry was heated to 85° C., cooled to 50° C., dehydrated and then dried to obtain a powder of the polyorganosiloxane-containing graft polymer.

Production Example 5

Synthesis of NM015

400 parts by weight of water and 12 parts (solid content) of a 10% sodium dodecylbenzenesulfonate aqueous solution were mixed in a 5-necked flask with a stirrer, a reflux condenser, a nitrogen inlet, a monomer addition port, and a thermometer, and then the resultant mixture was heated to 50° C. After the temperature of the solution reached 50° C., the inside air of the flask was replaced with nitrogen. Then, 10 parts of BA and 3 parts of t-dodecylmercaptan were added to the mixture. 30 minutes after, 0.01 parts (solid content) of para-menthan hydroperoxide, 0.3 parts of sodium formaldehyde sulfoxylate (SFS), 0.01 parts of disodium ethylenediaminetetracetate (EDTA), and 0.0025 parts of ferrous sulfate were added to the mixture, and then stirred for 1 hour. Then, a mixture of 90 parts by weight of BA, 27 parts by weight of t-dodecylmercaptan, and 0.09 parts (solid content) of para-menthan hydroperoxide was continuously added to the mixture over 3 hours. Then, postpolymerization was effected for 2 hours to obtain a latex containing a seed polymer.

Next, 2 parts (solid content) of the seed polymer was charged in a 5-necked flask with a stirrer, a reflux condenser, a nitrogen inlet, a monomer addition port, and a thermometer. Then, a mixture containing 300 parts (containing the water content of the latex containing the seed polymer) of pure water, 0.5 parts (solid content) of a 5% sodium dodecylbenzenesulfonate aqueous solution, 98 parts of octamethyl cyclotetrasiloxane, and 2.9 parts of mercaptopropylmethyldimethoxysilane was stirred by a homomixer at 7000 rpm for 5 minutes to prepare an emulsion of polyorganosiloxane forming components. The resultant emulsion was added to the flask at a time.

Next, 1 part (solid content) of a 10% dodecylbenzenesulfonic acid aqueous solution was added to the resultant mixture, and then the system was heated to 80° C. under stirring in a nitrogen stream. After the temperature reached 80° C., stirring was continued at $_80°$ C. for 10 hours, and then the mixture was cooled to 25° C. and allowed to stand for 20 hours. Then, the mixture was controlled to pH 6.2 with sodium hydroxide to terminate polymerization and obtain a latex containing polyorganosiloxane particles.

Then, 240 parts (containing the water content of the latex containing the organosiloxane particles) of pure water, and 70 parts (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts of sodium formaldehyde sulfoxylate (SFS), 0.01 parts of disodium ethylenediaminetetraacetate (EDTA), and 0.0025 parts of ferrous sulfate were added to the resultant mixture. Then, a mixture of 1.5 parts of ally methacrylate and 0.01 parts (solid content) of cumene hydroperoxide was added to the mixture at a time, and then stirred at 40° C. for 1 hour. Then, a mixture of 15.6 parts of MMA, 13.5 parts of n-butyl methacrylate, 0.9 parts of EA, and 0.06 parts (solid content) of cumene hydroperoxide was dropwisely added to the mixture over 1.5 hours. After the addition, stirring was further continued for 1 hour to obtain a latex of a graft copolymer.

Then, the latex was diluted with pure water to a solid content of 15%, and 4 parts (solid content) of a 25% calcium chloride aqueous solution was added to the latex to obtain coagulated slurry. Then, the coagulated slurry was heated to 80° C., cooled to 50° C., dehydrated and then dried to obtain a polyorganosiloxane-containing graft polymer.

Production Example 6

Synthesis of BTM026

400 parts by weight of water and 12 parts (solid content) of a 10% sodium dodecylbenzenesulfonate aqueous solution were mixed in a 5-necked flask with a stirrer, a reflux condenser, a nitrogen inlet, a monomer addition port, and a thermometer, and then the resultant mixture was heated to 50° C. After the temperature of the solution reached 50° C., the inside air of the flask was replaced with nitrogen. Then, 10 parts of BA and 3 parts of t-dodecylmercaptan were added to the mixture. 30 minutes after, 0.01 parts (solid content) of para-menthan hydroperoxide, 0.3 parts of sodium formaldehyde sulfoxylate (SFS), 0.01 parts of disodium ethylenediaminetetracetate (EDTA), and 0.0025 parts by weight of ferrous sulfate were added to the mixture, and then stirred for 1 hour. Then, a mixture of 90 parts of BA, 27. parts of t-dodecylmercaptan, and 0.09 parts (solid content) of para-menthan hydroperoxide was continuously added to the mixture over 3 hours. Then, postpolymerization was effected for 2 hours to obtain a latex containing a seed polymer.

Next, 2 parts (solid content) of the seed polymer was charged in a 5-necked flask with a stirrer, a reflux condenser, a nitrogen inlet, a monomer addition port, and a thermometer. Then, a mixture containing 300 parts (containing the water content of the latex containing the seed polymer) of pure water, 0.5 parts (solid content) of a 5% sodium dodecylbenzenesulfonate aqueous solution, 98 parts of octamethylcyclotetrasiloxane, and 2.9 parts of mercaptopropylmethyl dimethoxysilane was stirred by a homomixer at 7000 rpm for 5 minutes to prepare an emulsion of a polyorganosiloxane forming component. The resultant emulsion was added to the flask at a time.

Next, 1 part (solid content) of a 10% dodecylbenzenesulfonic acid aqueous solution was added to the resultant mixture, and then the system was heated to 80° C. under stirring in a nitrogen stream. After the temperature reached 80° C., stirring was continued at 80° C. for 10 hours, and then the mixture was cooled to 25° C. and allowed to stand for 20 hours. Then, the mixture was controlled to pH 6.2 with sodium hydroxide to terminate polymerization and obtain a latex containing polyorganosiloxane particles.

Then, 240 parts (containing the water content of the latex containing the organosiloxane particles) of pure water, and 75 parts (solid content) of the polyorganosiloxane particles were charged in a five-necked flask with a stirrer, a reflux condenser, a nitrogen inlet, a monomer addition port, and a thermometer, and the system was heated to 40° C. under stirring in a nitrogen stream. After the temperature reached 40° C., 0.2 parts of sodium formaldehyde sulfoxylate (SFS), 0.01 parts of disodium ethylenediaminetetraacetate (EDTA), and 0.0025 parts of ferrous sulfate were added to the resultant mixture. Then, a mixture of 1 part of ally methacrylate and 0.01 parts (solid content) of cumene hydroperoxide was added to the mixture at a time, and then stirred at 40° C. for 1 hour. Then, a mixture of 18.75 parts of MMA, 5 parts of BA, 1.25 parts of methacrylic acid, and 0.06 parts (solid content) of cumene hydroperoxide was dropwisely added to the mixture over 1.5 hours. After the addition, stirring was further continued for 1 hour to obtain a latex of a graft copolymer.

Then, the latex was diluted with pure water to a solid content of 15%, and 4 parts (solid content) of a 25% calcium chloride aqueous solution was added to the latex to obtain coagulated slurry. Then, the coagulated slurry was heated to 80° C., cooled to 50° C., dehydrated and then dried to obtain a polyorganosiloxane-containing graft polymer.

<Production Example of Acrylic Block Copolymer>

Production Example 7-1

Synthesis of 2A40T6.5

After the inside air of a polymerization vessel of a 500L reactor with a stirrer, which was capable of heating and cooling, was replaced with nitrogen, 840.1 g (5.9 mol) of copper bromide was charged in the vessel, and 12 L of acetonitrile (bubbled with nitrogen) was added to copper bromide. After the resultant mixture was heated at 70° C. for 30 minutes, 421.7 g (1.17 mol) of diethyl 2,5-dibromoadipate as an initiator, 41.4 L (288.9 mol) of BA, and 18.6 L (144.5 mol) of MEA were added to the mixture. Then, the mixture was heated at 85° C. under stirring, and 0.1 L (0.59 mol) of diethylenetriamine was added as a ligand to initiate polymerization.

After polymerization was initiated, about 0.2 ml of the polymerization solution was sampled from the polymerization solution with predetermined time intervals, and the BA conversion rate of each sampled solution was determined by gas chromatography analysis. In this polymerization, the polymerization rate was controlled by adding diethylenetriamine at any time. When the BA conversion rate was 94%, and the MEA conversion rate was 96%, 24.9 L (153.8 mol) of TBMA, 24.7 L (230.8 mol) of MMA, 580 g (5.9 mol) of copper chloride, 1.2 L (9.1 mol) of butyl acetate, and 122.8 L of toluene (bubbled with nitrogen) were added to the polymerization solution. Similarly, the conversion rates of TBMA and MMA were determined. When the TBMA conversion rate was 61% and the MMA conversion rate was 56%, 80L of toluene was added to the solution, and the reactor was cooled in a water bath to terminate the reaction.

The reaction solution was diluted with 115 L of toluene, and 1337 g of p-toluenesulfonic acid monohydrate was added to the reaction solution, and then stirred at room temperature for 3 hours. Then, the solid was removed with a bag filter (produced by HAYWARD Corporation). Then, 1642 g of an absorber, Kyoward 500SH (produced by Kyowa Chemical K. K.) was added to the resultant polymer solution, and further stirred at room temperature for 3 hours. The absorber was filtered off with a bag filter to obtain a colorless, transparent polymer solution. The solution was dried with a horizontal evaporator (heating surface area 1 m$^2$) to remove the solvent and residual monomers and obtain the target block copolymer 2A40T6.5.

As a result of GPC analysis of the thus-obtained block copolymer 2A40T6.5, the number-average molecular weight (Mn) was 93700, and the molecular weight distribution (Mw/Mn) was 1.36.

Production Example 7-2

Conversion Reaction into 6-member Ring Acid Anhydride of the Block Copolymer 2A40T6.5 and Characteristic Evaluation 700 g of the block copolymer (2A40T6.5) obtained in Production Example 7-1 and 1.4 g of Irganox 1010 (produced by Ciba Geigy Co., Ltd.) were melt-kneaded by a pressure kneader (DS1-5MHB-E model kneader produced by Moriyama Co., Ltd.) set to 240° C. at 70 rpm for 20 minutes to obtain the target 6-member ring acid anhydride group-containing acrylic block copolymer (the resultant polymer is referred to as "2A40AN6.5" hereinafter).

The conversion of a t-butyl ester site into a 6-member ring acid anhydride group could be confirmed by IR (infrared absorption spectrum) analysis and $^{13}$C-NMR (nuclear magnetic resonance spectrum) analysis.

Namely, the conversion could be confirmed by IR analysis in which an absorption spectrum due to an acid anhydride group was observed at about 1800cm$^{-1}$ after the conversion. Also, the conversion could be confirmed by $^{13}$C-NMR analysis in which signals at 82 ppm and 28 ppm due to methine carbon and methyl carbon, respectively, of a t-butyl group disappeared.

Production Example 8-1

Synthesis of 3A20T6.8

A target block copolymer (3A20T6.8) was obtained by the same production method as in Production Example 1 except that 427 g (1.18 mol) of diethyl 2,5-dibromoadipate, 25.3 L (176.6 mol) of BA, 24.1 L (222 mol) of EA, and 13.6 L (106 mol) of MEA were charged in a 500L reactor with a stirrer capable of heating and cooling, and polymerization was effected. When the BA conversion rate was 95%, the EA conversion rate was 95%, and the MEA conversion rate was 98%, 12.3 L (76.2 mol) of TBMA and 32.6 L (304.8 mol) of MMA were added to the polymerization solution. When the TBMA conversion rate was 67%, and the MMA conversion rate was 59%, the reaction was terminated.

As a result of GPC analysis of the thus-obtained block copolymer (3A20T6.8), the number-average molecular weight (Mn) was 107400, and the molecular weight distribution (Mw/Mn) was 1.28.

Production Example 8-2

Conversion Reaction into 6-member Ring Acid Anhydride of the Block Copolymer 3A20T6.8 and Characteristic Evaluation 700 g of the block copolymer (3A20T6.8) obtained in Production Example 8-1 and 1.4 g of Irganox 1010 (produced by Ciba Geigy Co., Ltd.) were melt-kneaded by a pressure kneader (DS1-5MHB-E model kneader produced by Moriyama Co., Ltd.) set to 240° C. at 70 rpm for 20 minutes to obtain the target 6-member ring acid anhydride group-containing block copolymer (the resultant polymer is referred to as "3A20AN6.8" hereinafter).

Production Example 9-1

Synthesis of 3A50T6

A target block copolymer (3A50T6) was obtained by the same production method as in Production Example 1 except that 424.9 g (1.18 mol) of diethyl 2,5-dibromoadipate, 22.5 L (157 mol) of BA, 21.4 L (197 mol) of EA, and 12.1 L (94.2 mol) of MEA were charged in a 500L reactor with a stirrer capable of heating and cooling, and polymerization was effected. When the BA conversion rate was 95%, the EA conversion rate was 95%, and the MEA conversion rate was 98%, 34.8 L (215 mol) of TBMA and 23 L (215 mol) of MMA were added to the polymerization solution. When the TBMA conversion rate was 67%, and the MMA conversion rate was 59%, the reaction was terminated.

As a result of GPC analysis of the thus-obtained block copolymer (3A50T6), the number-average molecular weight (Mn) was 101200, and the molecular weight distribution (Mw/Mn) was 1.28.

Production Example 9-2

Conversion Reaction into 6-member Ring Acid Anhydride of the Block Copolymer 3A50T6 and Characteristic Evaluation 700 g of the block copolymer (3A50T6) obtained in Production Example 9-1 and 1.4 g of Irganox 1010 (produced by Ciba Geigy Co., Ltd.) were melt-kneaded by a pressure kneader (DS1-5MHB-E model kneader produced by Moriyama Co., Ltd.) set to 240° C. at 70 rpm for 20 minutes to obtain the target 6-member ring acid anhydride group-containing block copolymer (the resultant polymer is referred to as "3A50AN6" hereinafter).

Production Example 10-1

Synthesis of 3A50T6.5

A target block copolymer (3A50T6.5) was obtained by the same production method as in Production Example 1 except that 483 g (1.34 mol) of diethyl 2,5-dibromoadipate, 27.3 L (190.6 mol) of BA, 26.0 L (239.6 mol) of EA, and 14.7 L (114.4 mol) of MEA were charged in a 500L reactor with a stirrer capable of heating and cooling, and polymerization was effected. When the BA conversion rate was 95%, the EA conversion rate was 95%, and the MEA conversion rate was 98%, 34.0 L (210 mol) of TBMA and 22.5 L (210 mol) of MMA were added to the polymerization solution. When the TBMA conversion rate was 67%, and the MMA conversion rate was 59%, the reaction was terminated.

As a result of GPC analysis of the thus-obtained block copolymer (3A50T6.5), the number-average molecular weight (Mn) was 98900, and the molecular weight distribution (Mw/Mn) was 1.28.

Production Example 10-2

Conversion Reaction into 6-member Ring Acid Anhydride of the Block Copolymer 3A50T6.5 and Characteristic Evaluation 700 g of the block copolymer (3A50T6.5) obtained in Production Example 10-1 and 1.4 g of Irganox 1010 (produced by Ciba Geigy Co., Ltd.) were melt-kneaded by a pressure kneader (DS1-5MHB-E model kneader produced by Moriyama Co., Ltd.) set to 240° C. at 70 rpm for 20 minutes to obtain the target 6-member ring acid anhydride group-containing block copolymer (the resultant polymer is referred to as "3A50AN6.5" hereinafter).

Production Example 11-1

Synthesis of 3A50T6.1

A target acrylic block copolymer (3A50T6.1) was obtained by the same production method as in Production Example 1 except that 634 g (1.76 mol) of diethyl 2,5-dibromoadipate, 33.8 L (235.5 mol) of BA, 32.1 L (296 mol) of EA, and 18.2 L (141.3 mol) of MEA were charged in a 500L reactor with a stirrer capable of heating and cooling, and polymerization was effected. When the BA conversion rate was 96%, the EA conversion rate was 95%, and the MEA conversion rate was 97%, 33.4 L (206 mol) of TBMA and 22.0 L (206.1 mol) of MMA were added to the polymerization solution. When the TBMA conversion rate was 91%, and the MMA conversion rate was 94%, the reaction was terminated.

As a result of GPC analysis of the thus-obtained acrylic block copolymer (3A50T6.1), the number-average molecular weight (Mn) was 104400, and the molecular weight distribution (Mw/Mn) was 1.31.

Production Example 11-2

Conversion Reaction into 6-member Ring Acid Anhydride of the Block Copolymer 3A50T6.1 and Characteristic Evaluation 100 parts by weight of the acrylic block copolymer (3A50T6.1) obtained in Production Example 11-1 and 0.6 parts by weight of Irganox 1010 (produced by Ciba Speciality Chemicals Co., Ltd.) were mixed, and then extrusion-kneaded by a vented two-screw extruder (44 mm, L/D=42.25) (produced by Japan Steel Works, Ltd.) at a rotational speed of 300 rpm and a set temperature of 240° C. to obtain the target acid anhydride group-containing acrylic block copolymer. In this example, an underwater cut pelletizer (produced by GALA INDUSTRIES INC. CLS-6-8.1 COMPACT LAB SYSTEM) was connected to the two-screw extruder, and Arflow H-50ES (produced by NOF Corporation) was added as a anti-adhesion agent to the circulating water of the water cut pelletizer, for obtaining spherical pellets with no adhesion (referred to as "3A50AN6.1" hereinafter).

Production Example 12-1

Synthesis of 3A60T6

A target acrylic block copolymer (3A60T6) was obtained by the same production method as in Production Example 1 except that 634 g (1.76 mol) of diethyl 2,5-dibromoadipate, 33.8 L (235.5 mol) of BA, 32.1 L (296 mol) of EA, and 18.2 L (141.3 mol) of MEA were charged in a 500L reactor with a stirrer capable of heating and cooling, and polymerization was effected. When the BA conversion rate was 96%, the EA conversion rate was 95%, and the MEA conversion rate was 96%, 40.5 L (249.6 mol) of TBMA and 17.8 L (166.6 mol) of MMA were added to the polymerization solution. When the TBMA conversion rate was 95%, and the MMA conversion rate was 92%, the reaction was terminated.

As a result of GPC analysis of the thus-obtained acrylic block copolymer (3A60T6), the number-average molecular weight (Mn) was 102100, and the molecular weight distribution (Mw/Mn) was 1.30.

Production Example 12-2

Conversion Reaction into 6-member Ring Acid Anhydride of the Block Copolymer 3A60T6 and Characteristic Evaluation 100 parts by weight of the acrylic block copolymer (3A60T6) obtained in Production Example 12-1 and 0.3 parts by weight of Irganox 1010 (produced by Ciba Speciality Chemicals Co., Ltd.) were mixed, and then extrusion-kneaded by a vented two-screw extruder (44 mm, L/D=42.25) (produced by Japan Steel Works, Ltd) at a rotational speed of 300 rpm and a set temperature of 240° C. to obtain the target acid anhydride group-containing acrylic block copolymer. In this example, an underwater cut pelletizer (produced by GALA INDUSTRIES INC. CLS-6-8.1 COMPACT LAB SYSTEM) was connected to the end of the two-screw extruder, and Arflow H-50ES (produced by NOF Corporation) was added as a anti-adhesion agent to the circulating water of the water cut pelletizer, for obtaining spherical pellets with no adhesion (referred to as "3A60AN6" hereinafter).

Production Example 13-1

Synthesis of 3A70T6

A target acrylic block copolymer (3A70T6) was obtained by the same production method as in Production Example 1 except that 634 g (1.76 mol) of diethyl 2,5-dibromoadipate, 33.8 L (235.5 mol) of BA, 32.1 L (296 mol) of EA, and 18.2 L (141.3 mol) of MEA were charged in a 500 L reactor with a stirrer capable of heating and cooling, and polymerization was effected. When the BA conversion rate was 96%, the EA conversion rate was 95%, and the MEA conversion rate was 96%, 45.5 L (281 mol) of TBMA and 12.9 L (120 mol) of MMA were added to the polymerization solution. When the TBMA conversion rate was 93%, and the MMA conversion rate was 91%, the reaction was terminated.

As a result of GPC analysis of the thus-obtained acrylic block copolymer (3A70T6), the number-average molecular weight (Mn) was 95600, and the molecular weight distribution (Mw/Mn) was 1.31.

Production Example 13-2

Conversion Reaction into 6-member Ring Acid Anhydride of the Block Copolymer 3A70T6 and Characteristic Evaluation 100 parts by weight of the acrylic block copolymer (3A70T6) obtained in Production Example 13-1 and 0.3 parts by weight of Irganox 1010 (produced by Ciba Speciality Chemicals Co., Ltd.) were mixed, and then extrusion-kneaded by a vented two-screw extruder (44 mm, L/D=42.25) (produced by Japan Steel Works, Ltd.) at a rotational speed of 300 rpm and a set temperature of 240° C. to obtain the target acid anhydride group-containing acrylic block copolymer. In this example, an underwater cut pelletizer (produced by GALA INDUSTRIES INC. CLS-6-8.1 COMPACT LAB SYSTEM) was connected to the end of the two-screw extruder, and Arflow H-50ES (produced by NOF Corporation) was added as a anti-adhesion agent to the circulating water of the water cut pelletizer, for obtaining spherical pellets with no adhesion (referred to as "3A70AN6" hereinafter).

Example 1

100 parts by weight of acrylic rubber (produced by Zeon Corporation, trade name AR42W), 35 parts by weight of the polyorganosiloxane-containing graft polymer particles (NM006) obtained in Production Example 1, 1 part by weight of an antioxidant (produced by Ciba Geigy, Co., Ltd., trade name Irganox 1010), and 1.5 parts by weight of ammonium benzoate were mixed by a plastomill "MODEL20C200" (produced by Toyo Seiki Co., Ltd.) to obtain a bulk sample according to a predetermined method. The thus-obtained bulk sample was pressed according to a predetermined method to obtain a molded sheet product having a thickness of 2 mm. Furthermore, the molded sheet product was annealed 170° C. for 4 hours, and them measured with respect to tensile properties, the low-temperature brittle temperature, and oil resistance. Also, the mold release property during press molding was evaluated. The results are shown in Table 1.

Example 2

A molded sheet product for evaluating characteristics was formed by the same method as in Example 1 except that the polyorganosiloxane-containing graft polymer (BTM002) produced in Production Example 2 was used, and the characteristics were evaluated. The results are shown in Table 1.

Comparative Example 1

A molded sheet product for evaluating characteristics was formed by the same method as in Example 1 except that the polyorganosiloxane-containing graft polymer was not used. The results are shown in Table 1.

TABLE 1

| | | | Example 1 | Example 2 | Comparative Example 1 |
|---|---|---|---|---|---|
| Tensile properties | 100% modulus | MPa | 0.5 | 0.4 | 0.2 |
| | Strength at break | MPa | 2.1 | 1.6 | 1.3 |
| | Elongation at break | % | 530 | 500 | 505 |
| Brittle temperature | | ° C. | −39 | −48 | −32 |
| Oil resistance | | % | 22 | 23 | 19 |
| Mold release property | | | ○ | ○ | x |

Example 3

100 parts by weight of acrylic rubber (produced by Zeon Corporation, trade name AR31), 45 parts by weight of the polyorganosiloxane-containing graft polymer particles (BTM048) obtained in Production Example 3, 1 part by weight of an antioxidant (produced by Ciba Geigy, Co., Ltd., trade name Irganox 1010), and 1.5 parts by weight of ammonium benzoate were mixed by a plastomill "MODEL20C200" (produced by Toyo Seiki Co., Ltd.) to obtain a bulk sample according to a predetermined method. The thus-obtained bulk sample was pressed according to a predetermined method to obtain a molded sheet product having a thickness of 2 mm. Furthermore, the molded sheet product was annealed 170° C. for 8 hours, and them measured with respect to tensile properties, the low-temperature brittle temperature, low-temperature elastic recovery (TR properties) and oil resistance. Also, the mold release property during press molding was evaluated. The results are shown in Table 2.

Comparative Example 2

A molded sheet product for evaluating characteristics was formed by the same method as in Example 3 except that the polyorganosiloxane-containing graft polymer was not used. The results are shown in Table 2.

TABLE 2

|  |  |  | Example 3 | Comparative Example 2 |
|---|---|---|---|---|
| Tensile properties | 100% modulus | MPa | 0.5 | 0.4 |
|  | Strength at break | MPa | 2.9 | 2.5 |
|  | Elongation at break | % | 510 | 498 |
|  | Brittle temperature | °C. | −60 | −20 |
| TR properties | TR10 | °C. | −16 | 13 |
|  | TR30 | °C. | −13 | −10 |
|  | TR50 | °C. | −10 | −6 |
|  | TR70 | °C. | −5 | Not recovered |
| Oil resistance |  | % | 20 | 13 |
| Mold release property |  |  | ○ | x |

The results shown in Table 1 (Examples 1 and 2 and Comparative Example 1) indicate that the low-temperature characteristics can be significantly improved without great deterioration in the tensile properties and oil resistance. The results shown in Table 2 indicate that the low-temperature elastic recovery (TR properties, tensile permanent set at low temperature) as well as the low-temperature brittle temperature can be improved without great deterioration in the tensile properties and oil resistance.

Example 4

36 g of the acrylic block copolymer (2A40AN6.5) obtained in Production Example 7-2 and 9 g of the polyorganosiloxane-containing graft polymer particles (PM122) obtained in Production Example 4 were first melt-kneaded with a plastomill "MODEL20C200" (produced by Toyo Seiki Co., Ltd.) set to 50° C. at 150 rpm for 5 minutes. When the temperature rise of the resins due to shear heating of the resins was stopped, melt kneading was performed at a temperature set to 220° C. and the same rotational speed for 10 minutes. The resultant bulk sample was heat-pressed at 220° C. to obtain a molded cylindrical product having a diameter of 30 mm and a thickness of 12 mm for evaluating compression permanent set. The molded product was measured with respect to the compression permanent set and hardness.

Similarly, the bulk sample was heat-pressed to obtain a molded sheet product having a thickness of 2 mm, and the molded sheet product was measured with respect to the low-temperature brittle temperature, tensile properties, and oil resistance. The results are shown in Table 3.

Example 5

33.3 g of the acrylic block copolymer (2A40AN6.5) obtained in Production Example 7-2 and 11.7 g of the polyorganosiloxane-containing graft polymer particles (PM122) obtained in Production Example 4 were first melt-kneaded with a plastomill "MODEL20C200" (produced by Toyo Seiki Co., Ltd.) set to 50° C. at 150 rpm for 5 minutes. When the temperature rise of the resins due to shear heating of the resins was stopped, melt kneading was performed at a temperature set to 220° C. and the same rotational speed for 10 minutes. The resultant bulk sample was heat-pressed at 220° C. to obtain a molded cylindrical product having a diameter of 30 mm and a thickness of 12 mm for evaluating compression permanent set. The molded product was measured with respect to the compression permanent set and hardness.

Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Example 6

27.3 g of the acrylic block copolymer (3A50AN6.5) obtained in Production Example 10-2 and 17.7 g of the polyorganosiloxane-containing graft polymer particles (PM122) obtained in Production Example 4 were first melt-kneaded with a plastomill "MODEL20C200" (produced by Toyo Seiki Co., Ltd.) set to 50° C. at 150 rpm for 5 minutes. When the temperature rise of the resins due to shear heating of the resins was stopped, melt kneading was performed at a temperature set to 220° C. and the same rotational speed for 10 minutes. The resultant bulk sample was heat-pressed at 220° C. to obtain a molded cylindrical product having a diameter of 30 mm and a thickness of 12 mm for evaluating compression permanent set. The molded product was measured with respect to hardness. Also, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Example 7

5.5 g of the acrylic block copolymer (2A40AN6.5) obtained in Production Example 7-2, 10.9 g of the acrylic block copolymer (3A20AN6.8) obtained in Production Example 8-2, 10.9 g of the acrylic block copolymer (3A50AN6) obtained in Production Example 9-2, and 17.7 g of the polyorganosiloxane-containing graft polymer particles (PM122) obtained in Production Example 4 were first melt-kneaded with a plastomill "MODEL20C200" (produced by Toyo Seiki Co., Ltd.) set to 50° C. at.150 rpm for 5 minutes. When the temperature rise of the resins due to shear heating of the resins was stopped, the temperature was set to 220° C. at the same rotational speed, and 0.05 g of a lubricant (produced by NOF Corporation, Arflow H-50ES), and 2.2 g of an inorganic filler (produced by Japan Aerosil Co., Ltd., Aerosil R972) were added to the resin mixture at a rotational speed of 100 rpm. After the completion of addition, the rotational speed was again changed to 150 rpm, and then melt kneading was performed for 10 minutes. The resultant bulk sample was heat-pressed at 220° C. to obtain a molded cylindrical product having a diameter of 30 mm and a thickness of 12 mm for evaluating compression permanent set. The molded product was measured with respect to hardness.

Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Comparative Example 3

45 g of the acrylic block copolymer (2A40AN6.5) obtained in Production Example 7-2 was melt-kneaded with a plastomill "MODEL20C200" (produced by Toyo Seiki Co., Ltd.) set to 220° C. at 100 rpm for 15 minutes. The resultant bulk sample was heat-pressed at 220° C. to obtain a molded cylindrical product having a diameter of 30 mm and a thickness of 12 mm for evaluating compression permanent set. The molded product was measured with respect to the compression permanent set and hardness. Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Comparative Example 4

45 g of the acrylic block copolymer (3A20AN6.8) obtained in Production Example 8-2 was melt-kneaded with a plastomill "MODEL20C200" (produced by Toyo Seiki Co., Ltd.) set to 220° C. at 100 rpm for 15 minutes. The resultant bulk sample was heat-pressed at 220° C. to obtain a molded cylindrical product having a diameter of 30 mm and a thickness of 12 mm for evaluating compression permanent set. The molded product was measured with respect to the compression permanent set and hardness. Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Comparative Example 5

45 g of the acrylic block copolymer (3A50AN6) obtained in Production Example 9-2 was melt-kneaded with a plastomill "MODEL20C200" (produced by Toyo Seiki Co., Ltd.) set to 220° C. at 100 rpm for 15 minutes. The resultant bulk sample was heat-pressed at 220° C. to obtain a molded cylindrical product having a diameter of 30 mm and a thickness of 12 mm for evaluating compression permanent set. The molded product was measured with respect to the compression permanent set and hardness. Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Comparative Example 6

45 g of the acrylic block copolymer (3A50AN6.5) obtained in Production Example 10-2 was melt-kneaded with a plastomill "MODEL20C200" (produced by Toyo Seiki Co., Ltd.) set to 220° C. at 100 rpm for 15 minutes. The resultant bulk sample was heat-pressed at 2200C to obtain a molded cylindrical product having a diameter of 30 mm and a thickness of 12 mm for evaluating compression permanent set. The molded product was measured with respect to the compression permanent set and hardness. Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

Comparative Example 7

18 g of the block copolymer (3A50AN6) obtained in Production Example 9-2, 18 g of the block copolymer (3A20AN6.8) obtained in Production Example 8-2, and 9 g of the block copolymer (2A40AN6.5) obtained in Production example 7-2 were melt-kneaded with a plastomill "MODEL20C200" (produced by Toyo Seiki Co., Ltd.) set to 220° C. at 100 rpm for 5 minutes. Then, 0.05 g of a lubricant (produced by NOF Corporation, Arflow H-50ES), and 2.2 g of an inorganic filler (produced by Japan Aerosil Co., Ltd., Aerosil R972) were added to the resin mixture, and then melt kneading was performed for 10 minutes. The resultant bulk sample was heat-pressed at 220° C. to obtain a molded cylindrical product having a diameter of 30 mm and a thickness of 12 mm for evaluating compression permanent set. The molded product was measured with respect to hardness. Similarly, the bulk sample was heat-pressed to obtain a molded sheet product having a thickness of 2 mm, and the molded sheet product was measured with respect to the low-temperature brittle temperature, oil resistance and tensile properties. The results are shown in Table 3.

TABLE 3

| | | | Examples | | | | Comparative Examples | | | | |
|---|---|---|---|---|---|---|---|---|---|---|---|
| | No. | | 4 | 5 | 6 | 7 | 3 | 4 | 5 | 6 | 7 |
| Composition (parts) | Acrylic block copolymer | 2A40AN6.5 | 100 | 100 | | 20 | 100 | | | | 20 |
| | | 3A20AN6.5 | | | | 40 | | 100 | | | 40 |
| | | 3A50AN6 | | | | 40 | | | 100 | | 40 |
| | | 3A50AN6.5 | | | 100 | | | | | 100 | |
| | Polyorgano-siloxane-containing graft copolymer | PM122 (*) | 25 (20) | 35 (25.9) | 65 (39.4) | 65 (39.4) | | | | | |
| | Lubricant | Lubricant 1 | | | | 0.2 | | | | | 0.2 |
| | Filler | Inorganic filler 1 | | | | 8 | | | | | 8 |
| Evaluation results | Hardness (JIS-A) | | 30 | 32 | 68 | 83 | 25 | 67 | 66 | 44 | 56 |
| | Low-temperature brittleness | Brittle temperature (° C.) | −57.5 | −60 | −65≧ | −59 | −39.5 | −24 | −27 | −29 | −18 |
| | Tensile properties | Strength at break (MPa) | 7 | 7 | 11 | 10 | 7 | 12 | 15 | 13.7 | 11 |

TABLE 3-continued

|  |  | Examples | | | | Comparative Examples | | | | |
| --- | --- | --- | --- | --- | --- | --- | --- | --- | --- | --- |
| No. |  | 4 | 5 | 6 | 7 | 3 | 4 | 5 | 6 | 7 |
|  | Modulus (MPa) | 1.1 | 1.5 | 5.1 | 16 | 0.5 | 3 | 5 | 1.2 | 3 |
|  | Elongation at break (%) | 292 | 292 | 352 | 295 | 282 | 300 | 255 | 323 | 260 |
| Oil resistance | Rate of weight change (wt %) | 26 | 23 | 32 | 28 | 33 | 17 | 16 | 19 | 19 |
|  | Shape after immersion | ○ | ○ | ○ | ○ | Δ | ○ | ○ | ○ | ○ |
| Compression permanent set | (%) | 48 | — | — | — | 50 | 75 | 54 | 50 | — |

(*) percent by weight relative to the block copolymer

The results shown in Table 3 (Examples 4 to 7 and Comparative Examples 3 to 7) indicate that the molded products comprising the compositions respectively formed by introducing the polyorganosiloxane-containing graft polymer into the acrylic block copolymers in the Examples 4, 5, and 6 of the present invention maintain good tensile properties, compression permanent set and oil resistance, and have excellent modulus as a tensile property and low-temperature characteristics, as compared with the molded products comprising only the acrylic block copolymer formed in Comparative Examples 3 and 6. Also, it is found that a combination with the polyorganosiloxane-containing graft polymer, the lubricant and the inorganic filler shown in Example 7 is a material having excellent modulus as a tensile property and low-temperature characteristics, as compared with the materials of Comparative Examples 3 to 7.

Example 8

727 g of the acrylic block copolymer (3A50AN6.1) obtained in Production Example 11-2, and 472.7g of polyorganosiloxane-containing graft polymer (PM122) obtained in Production Example 4 were sufficiently mixed by hand blending to form a uniform dispersion. The resultant dispersion was melt-kneaded by a vented two-screw extruder "TEX30HSS-25.5PW-2V" (produced by Japan Steel Works, Ltd.) comprising a die including three stacked stainless wire nets having 100 mesh, 150 mesh and 100 mesh, respectively, under kneading conditions in which C1 to C4 were 50° C., C5 was 100° C., C6 was 150° C., C7 was 200° C., a die head was 220° C., and a rotational speed was 100 rpm. The extruded strand was palletized by a pelletizer "SCF-100" (produced by Isuzu Kakoki Co., Ltd.) for facilitating injection molding. The obtained pellets were dried at 80° C. for 3 hours or more, and molded into a plate of 120×120×2 mm by injection molding using an injection molding machine "IS-80EPN" (produced by Toshiba Machine Co., Ltd.) under conditions in which the clamping pressure was 80 ton, the nozzle temperature was 240° C., the injection pressure was 50%, the injection rate was 50%, and the mold temperature was 80° C. The three plates were stacked and measured with respect to hardness, and the plate of 2 mm was cut into a shape necessary for evaluation, and measured with respect to the low-temperature brittle temperature, oil resistance and tensile properties. The results are shown in Table 4.

Example 9

1515.2 g of the acrylic block copolymer (3A60AN6) obtained in Production Example 12-2, and 984.8 g of the polyorganosiloxane-containing graft polymer (NM15) obtained in Production Example 5 were sufficiently mixed by hand blending to form a uniform dispersion. Then, kneading and injection molding were performed by the same methods as in Example 8 to obtain a plate of 120×120×2 mm. The three plates were stacked and measured with respect to hardness, and the plate of 2 mm was cut into a shape necessary for evaluation, and measured with respect to the low-temperature brittle temperature, oil resistance and tensile properties. The results are shown in Table 4.

Example 10

727 g of the acrylic block copolymer (3A70AN6) obtained in Production Example 13-2, and 472.7 g of the polyorganosiloxane-containing graft polymer (NM15) obtained in Production Example 5 were sufficiently mixed by hand blending to form a uniform dispersion. Then, kneading and injection molding were performed by the same methods as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Example 11

533.3 g of the acrylic block copolymer (3A70AN6) obtained in Production Example 13-2, and 266.7 g of the polyorganosiloxane-containing graft polymer (BMT26) obtained in Production Example 6 were sufficiently mixed by hand blending to form a uniform dispersion. Then, kneading and injection molding were performed by the same methods as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Example 12

1466.3 g of the acrylic block copolymer (3A70AN6) obtained in Production Example 13-2, 953.1 g of the polyorganosiloxane-containing graft polymer (NM15) obtained in Production Example 5, and 73.3 g of a thermoplastic resin (nylon 6 produced by Ube Industries, Ltd., 1013B) were sufficiently mixed by hand blending to for a uniform dispersion. Then, the resultant dispersion was melt-kneaded by a vented two-screw extruder "TEX30HSS-25.5PW-2V" (produced by Japan Steel Works, Ltd.) comprising a die including three stacked stainless wire nets having 100 mesh, 150 mesh and 100 mesh, respectively, under kneading conditions in which C1 to C4 were 50° C., C5 was 80° C., C6 was 100° C., C7 was 240° C., a die head was 240° C., and a rotational speed was 100 rpm. The extruded strand was palletized by a pelletizer "SCF-100" (produced by Isuzu Kakoki Co., Ltd.) for facilitating injection molding. Injection molding was performed by the same method as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Example 13

Physical Properties of an Injection Molded Product of a Mixture of the Acrylic Block Copolymer (3A50AN6.1), the polyorganosiloxane-containing graft polymer (NM15), and a lubricant (amino-modified silicone)

1918.6 g of the acrylic block copolymer (3A50AN6.1) obtained in Production Example 11-2, 575.6 g of the polyorganosiloxane-containing graft polymer (NM15) obtained in Production Example 5, and 5.8 g of a lubricant (amino-modified silicone produced by Nippon Unicar Co., Ltd., FZ-3508) were sufficiently mixed by hand blending to form a uniform dispersion. Kneading and injection molding were performed by the same methods as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Example 14

Physical Properties of an Injection Molded Product of a Mixture of the Acrylic Block Copolymer (3A70AN6), the Polyorganosiloxane-Containing Graft Polymer (NM15), and an Inorganic Filler (Carbon Black)

604.2 g of the acrylic block copolymer (3A70AN6) obtained in Production Example 13-2, 392.7 g of the polyorganosiloxane-containing graft polymer (NM15) obtained in Production Example 5, and 3.0 g of an inorganic filler (carbon black produced by Asahi Carbon Co., Ltd., Asahi #15) were sufficiently mixed by hand blending to form a uniform dispersion. Kneading and injection molding were performed by the same methods as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Comparative Example 8

Physical Properties of an Injection Molded Product of the Acrylic Block Copolymer (3A50AN6.1)

The acrylic block copolymer (3A50AN6.1) obtained in Production Example 11-2 was molded by injection molding under the same conditions as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Comparative Example 9

Physical Properties of an Injection Molded Product of the Acrylic Block Copolymer (3A60AN6)

The acrylic block copolymer (3A60AN6) obtained in Production Example 12-2 was molded by injection molding under the same conditions as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

Comparative Example 10

Physical Properties of an Injection Molded Product of the Acrylic Block Copolymer (3A70AN6)

The acrylic block copolymer (3A70AN6) obtained in Production Example 13-2 was molded by injection molding under the same conditions as in Example 8 to obtain a plate of 120×120×2 mm. The three plates were stacked and measured with respect to hardness, and the plate of 2 mm was cut into a shape necessary for evaluation and measured with respect to the low-temperature brittle temperature, oil resistance and tensile properties. The results are shown in Table 4.

TABLE 4

| | | | Example | | | | | | | Comparative Example | | |
|---|---|---|---|---|---|---|---|---|---|---|---|---|
| No. | | | 8 | 9 | 10 | 11 | 12 | 13 | 14 | 8 | 9 | 10 |
| Composition (parts) | Acrylic block copolymer | 3A50AN6.1 | 100 | | | | | 100 | | 100 | | |
| | | 3A60AN6 | | 100 | | | | | | | 100 | |
| | | 3A70AN6 | | | 100 | 100 | 100 | | 100 | | | 100 |
| | Polyorgano-siloxane-containing graft polymer | PM122 (*) | 45 (31) | | | | | | | | | |
| | | NM15 (*) | | 65 (39.4) | 65 (39.4) | | 65 (39.4) | 30 (23.1) | 65 (39.4) | | | |
| | | BTM26 (*) | | | | 50 (33.3) | | | | | | |
| | Thermoplastic resin | Ny6 1013B | | | | | 5 | | | | | |
| | Lubricant | Amino-modified | | | | | | 0.3 | | | | |

TABLE 4-continued

| | | Example | | | | | | | Comparative Example | | |
|---|---|---|---|---|---|---|---|---|---|---|---|
| No. | | 8 | 9 | 10 | 11 | 12 | 13 | 14 | 8 | 9 | 10 |
| Evaluation results | Pigment silicone Asahi #15 | | | | | | | 0.5 | | | |
| | Hardness (JIS-A) | 68 | 74 | 72 | 63 | 72 | 61 | 74 | 46 | 40 | 41 |
| | Low-temperature brittleness | Brittle temperature (° C.) | | | | | | | | | |
| | | −45 | −65≧ | −55 | −48.5 | −65≧ | −52.5 | −65≧ | −36.5 | −34.5 | −32.5 |
| | Tensile properties | Strength at break (MPa) | | | | | | | | | |
| | | 10.5 | 10.5 | 10 | 9.5 | 10.4 | 10.2 | 10.6 | 10.4 | 11.5 | 10.6 |
| | | Modulus (MPa) | | | | | | | | | |
| | | 6.9 | 11.8 | 9.6 | 4.7 | 14.3 | 5.6 | 10.8 | 4.9 | 1.7 | 1.8 |
| | | Elongation at break (%) | | | | | | | | | |
| | | 338 | 343 | 335 | 315 | 277 | 302 | 335 | 295 | 313 | 307 |
| | Oil resistance | Rate of weight change (wt %) | | | | | | | | | |
| | | 28 | 31 | 30 | 27 | 27 | 26 | 30 | 18 | 17 | 17 |
| | | Shape after immersion | | | | | | | | | |
| | | ○ | ○ | ○ | ○ | ○ | ○ | ○ | ○ | ○ | ○ |

(*) percent by weight relative to the block copolymer

The results shown in Table 4 (Examples 8 to 14 and Comparative Examples 8 to 10) indicate that the molded products comprising the compositions respectively formed by introducing the polyorganosiloxane-containing graft polymers into the acrylic block copolymers in Examples 8, 9, 10 and 11 of the present invention maintain good tensile properties and oil resistance, and have excellent modulus as a tensile property and low-temperature characteristics, as compared with the molded products comprising only the acrylic block copolymers respectively formed in Comparative Examples 8, 9 and 10. Also, it is found that a mixture of the polyorganosiloxane-containing graft polymer, the thermoplastic resin, the lubricant, and the inorganic filler shown in each of Examples 12, 13 and 14 is a material having excellent modulus as a tensile property and low-temperature characteristics, as compared with the materials of Comparative Examples 8 to 10.

INDUSTRIAL APPLICABILITY

The acrylic elastomer composition of the present invention can be widely used for gaskets and packings. Particularly, the composition can be preferably used for molded products for automobile, electric and electronic parts. For example, in the automobile field, the composition can be used for body parts such as a seal for maintaining airtightness, a glass vibration control material, and a vibration proof material for a car body, particularly for a window seal gasket, and a door glass gasket. The material can also be used for chassis parts such as a vibration-proof and sound-proof engine and suspension rubber, particularly for an engine mount rubber. Furthermore, the composition can be used for engine parts such as cooling, fuel supply and exhaust control hoses, an engine oil seal, and the like. The composition can also be used for boots and covers for automobile underbodies, such as a constant velocity joint boot, a rack and opinion boot, a strut boot, a steering rack boot, and various dustcovers such as a suspension dustcover, a suspension tierod dustcover, a stabilizer tierod dustcover, and the like. The composition can also be used for exhaust gas purifying device parts, and brake parts. In the field of household electric appliances, the composition can be used for packings, an O-ring, a belt, and the like. Examples of parts of household electric appliances include lighting ornaments, water-proof packings, vibration-proof rubbers, insect-proof packings, vibration-proof and sound-proof air seals for cleaners, drip-proof covers for electric water heaters, waterproof packings, heater packings, electrode packings, safety valve diaphragms, sake-warming device hoses, water-proof packings, solenoid valves, water-proof packings for steam oven ranges and jar rice cookers, feed tank packings, suction valves, catch packings, connecting hoses, belts, insulating heater packings, burning appliance oil packings such as steam nozzle seals, and the like, O-rings, drain packings, pressure packings, air-blow tubes, air-supply and air intake packings, vibration-proof rubbers, oil supply packings, oil gauge packings, oil transfer tubes, diaphragm valves, air-supply tubes, and speaker gaskets, speaker edges, turn table sheets, belts, pulleys for audio equipment, and the like. In the architectural field, the composition can be used for structural gaskets (dipper gaskets), air-inflated membrane structures roof materials, waterproof materials, shaped sealing materials, vibration-proof materials, sound-proof materials, setting blocks, sliding materials, and the like. In the sport field, the composition can be used for all-weather paving materials such as sport floors, gymnasium floors, soles and slipsoles of sport shoes, ball-game balls such as golf bolls, and the like. In the field of vibration-proof rubbers, the composition can be used for automobile vibration-proof rubbers, railway vehicle vibration-proof rubbers, aircraft vibration-proof rubbers, tenders, and the like. In the marine and civil field, the composition can be used for structural materials such as rubber expansion joints, bearings, water stops, waterproof sheets, rubber dams, elastic pavement, vibration-proof pats, protecting materials, and the like; construction submaterials such as rubber frames, rubber packers, rubber skirts, sponge mats, mortar hoses, mortar strainers, and the like; construction auxiliary materials such as rubber sheets, air hoses, and the like; safety goods such as rubber buoys, wave absorbing materials, and the like; environmentally sound products such as oil fences, silt fences, antifouling materials, marine hoses, dredging hoses, oil skimmers, and the like. The composition can also be used for rubber plates, mats, foam plates, and the like.

The invention claimed is:

1. An acrylic elastomer composition comprising an acrylic elastomer (A), and a polyorganosiloxane-containing graft polymer (B) wherein the graft component of the polyorganosiloxane-containing graft polymer (B) contains 5 to 99.5 percent by weight of an alkyl methacrylate, and 95 to 0.5 percent by weight of an alkyl acrylate on the basis of the entirety of the graft component, and wherein the graft component of the polyorganosiloxane-containing graft polymer (B) contains 0.5 to 50 percent by weight of n-butyl methacrylate as an essential alkyl methacrylate component on the basis of the entirety of the grant component.

2. An acrylic elastomer composition comprising an acrylic elastomer (A), and a polyorganosiloxane-containing graft polymer (B), wherein the polyorganosiloxane-containing graft polymer (B) comprises 5 to 40 percent by weight of a graft component, and 95 to 60 percent by weight of a poly organosiloxane, and wherein the graft component of the polyorganosiloxane-containing graft polymer (B) contains 0.5 to 10 percent by weight of methacrylic acid or acrylic acid on the basis of the entirety of the graft component.

3. An acrylic elastomer composition comprising an acrylic elastomer (A), and a polyorganosiloxane-containing graft polymer (B), wherein the acrylic elastomer (A) comprises a mixture of acrylic block copolymers including an acrylic block copolymer (E-1) comprising an acrylic polymer block (a1) and a methacrylic polymer block (b), and an acrylic block copolymer (E-2) comprising an acrylic polymer block (a2) different from the acrylic polymer block (a1) and the methacrylic polymer block (b), the acrylic block copolymer (E-1) having a low-temperature brittle temperature which is at least 5° C. higher than that of the acrylic block copolymer (E-2).

4. The acrylic elastomer composition according to any one of claims 1, 2, 3, or 3, further comprising 0.1 to 10 parts by weight of a lubricant, 0.1 to 100 parts by weight of an inorganic filler, and 0.1 to 100 parts by weight of a thermoplastic resin on the basis of 100 parts by weight of the acrylic elastomer (A).

5. A molded product comprising the acrylic elastomer composition according to any one of claims 1, 2, or 3.

6. An automobile, electric or electronic part comprising the molded product of the acrylic elastomer composition according to claim 5.

* * * * *

UNITED STATES PATENT AND TRADEMARK OFFICE
CERTIFICATE OF CORRECTION

PATENT NO. : 7,449,521 B2  Page 1 of 1
APPLICATION NO. : 10/549708
DATED : November 11, 2008
INVENTOR(S) : Kentaro Takesada et al.

It is certified that error appears in the above-identified patent and that said Letters Patent is hereby corrected as shown below:

In column 50, claim 4, line 8, after "of claims" delete "1, 2, 3, or 3," and substitute --1, 2, or 3,-- in its place.

Signed and Sealed this

Second Day of June, 2009

JOHN DOLL
*Acting Director of the United States Patent and Trademark Office*